US010866313B2

(12) United States Patent
Gassend et al.

(10) Patent No.: US 10,866,313 B2
(45) Date of Patent: Dec. 15, 2020

(54) VEHICLE SENSOR SYNCHRONIZATION USING AN EXTERNAL CLOCK SOURCE

(71) Applicant: Waymo LLC, Mountain View, CA (US)

(72) Inventors: Blaise Gassend, East Palo Alto, CA (US); Benjamin Ingram, Santa Clara, CA (US); Luke Wachter, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 483 days.

(21) Appl. No.: 15/644,146

(22) Filed: Jul. 7, 2017

(65) Prior Publication Data

US 2019/0011544 A1    Jan. 10, 2019

(51) Int. Cl.
| | | |
|---|---|---|
| *G01S 7/497* | (2006.01) | |
| *G01S 7/481* | (2006.01) | |
| *G01S 17/87* | (2020.01) | |
| *G01S 13/931* | (2020.01) | |
| *G01S 17/86* | (2020.01) | |
| *G01S 17/931* | (2020.01) | |
| *G01S 7/40* | (2006.01) | |

(52) U.S. Cl.
CPC ......... *G01S 7/4972* (2013.01); *G01S 7/4813* (2013.01); *G01S 13/931* (2013.01); *G01S 17/86* (2020.01); *G01S 17/87* (2013.01); *G01S 17/931* (2020.01); *G01S 2007/4039* (2013.01); *G01S 2013/93271* (2020.01); *G01S 2013/93272* (2020.01); *G01S 2013/93273* (2020.01)

(58) Field of Classification Search
CPC ...... G01S 7/4972; G01S 13/04; G01S 13/865; G01S 13/931; G01S 17/026; G01S 17/936; G01S 17/023; G01S 17/10; G01S 17/42; G01S 13/87; G01S 7/4026; G01S 2013/9385; G01S 2013/9382; G01S 2007/4039; G01S 2013/9375; G01S 2013/9378
See application file for complete search history.

(56) References Cited

U.S. PATENT DOCUMENTS

| | | |
|---|---|---|
| 6,529,803 B2 | 3/2003 | Meyers et al. |
| 7,064,817 B1 | 6/2006 | Schmitt et al. |
| 7,411,661 B2 | 8/2008 | Kim |
| (Continued) | | |

FOREIGN PATENT DOCUMENTS

WO    2017019725 A1    2/2017

OTHER PUBLICATIONS

International Search Report and Written Opinion for PCT/US2018/031517, dated Aug. 23, 2018.

*Primary Examiner* — Luke D Ratcliffe
(74) *Attorney, Agent, or Firm* — McDonnell Boehnen Hulbert & Berghoff LLP

(57) ABSTRACT

An example system includes a light detection and ranging (LIDAR) device that scans a field-of-view defined by a pointing direction of the LIDAR device. The system also includes an actuator that adjusts the pointing direction of the LIDAR device. The system also includes a communication interface that receives timing information from an external system. The system also includes a controller that causes the actuator to adjust the pointing direction of the LIDAR device based on at least the received timing information.

20 Claims, 11 Drawing Sheets

(56) References Cited

U.S. PATENT DOCUMENTS

| | | | |
|---|---|---|---|
| 8,752,969 B1* | 6/2014 | Kane | G02B 7/1821 |
| | | | 359/872 |
| 8,922,421 B2 | 12/2014 | Pomietlasz | |
| 9,322,646 B2 | 4/2016 | Pochiraju et al. | |
| 9,383,753 B1 | 7/2016 | Templeton et al. | |
| 9,628,170 B1 | 4/2017 | Rosenband et al. | |
| 9,651,658 B2 | 5/2017 | Pennecot et al. | |
| 2009/0262760 A1* | 10/2009 | Krupkin | G01S 7/484 |
| | | | 372/6 |
| 2012/0173185 A1 | 7/2012 | Taylor et al. | |
| 2013/0289824 A1 | 10/2013 | Mudalige et al. | |
| 2015/0331422 A1* | 11/2015 | Hartung | H04L 12/40013 |
| | | | 701/23 |
| 2016/0001781 A1 | 1/2016 | Fung et al. | |
| 2016/0003938 A1 | 1/2016 | Gazit et al. | |
| 2017/0010614 A1 | 1/2017 | Shashua et al. | |
| 2017/0115387 A1* | 4/2017 | Luders | G01S 13/865 |
| 2019/0243002 A1* | 8/2019 | Song | B60Q 9/00 |

* cited by examiner

VEHICLE SENSOR SYNCHRONIZATION USING AN EXTERNAL CLOCK SOURCE

BACKGROUND

A vehicle can include one or more sensors that are configured to detect information about the environment in which the vehicle operates.

Active sensors, such as light detection and ranging (LI-DAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a system includes a light detection and ranging (LIDAR) device that scans a field-of-view defined by a pointing direction of the LIDAR device. The system also includes an actuator that adjusts the pointing direction of the LIDAR device. The system also includes a communication interface that receives timing information from an external system. The system also includes a controller that causes the actuator to adjust the pointing direction of the LIDAR device based on at least the received timing information.

In another example, a vehicle includes a light detection and ranging (LIDAR) device that scans a field-of-view defined by a pointing direction of the LIDAR device. The vehicle also includes an actuator that rotates the LIDAR device about an axis to adjust the pointing direction of the LIDAR device. The vehicle also includes a communication interface that receives timing information from an external system. The vehicle also includes a controller that causes the actuator to adjust one or more characteristics of the rotation of the LIDAR device based on at least the received timing information.

In yet another example, a method involves scanning a field-of-view defined by a pointing direction of a LIDAR device. The method also involves receiving timing information from an external system. The method also involves adjusting the pointing direction of the LIDAR device based on at least the received timing information.

In still another example, a system comprises means for scanning a field-of-view defined by a pointing direction of a light detection and ranging (LIDAR) device. The system further comprises means for receiving timing information from an external system. The system further comprises means for adjusting the pointing direction of the LIDAR device based on at least the received timing information.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Figure 1:
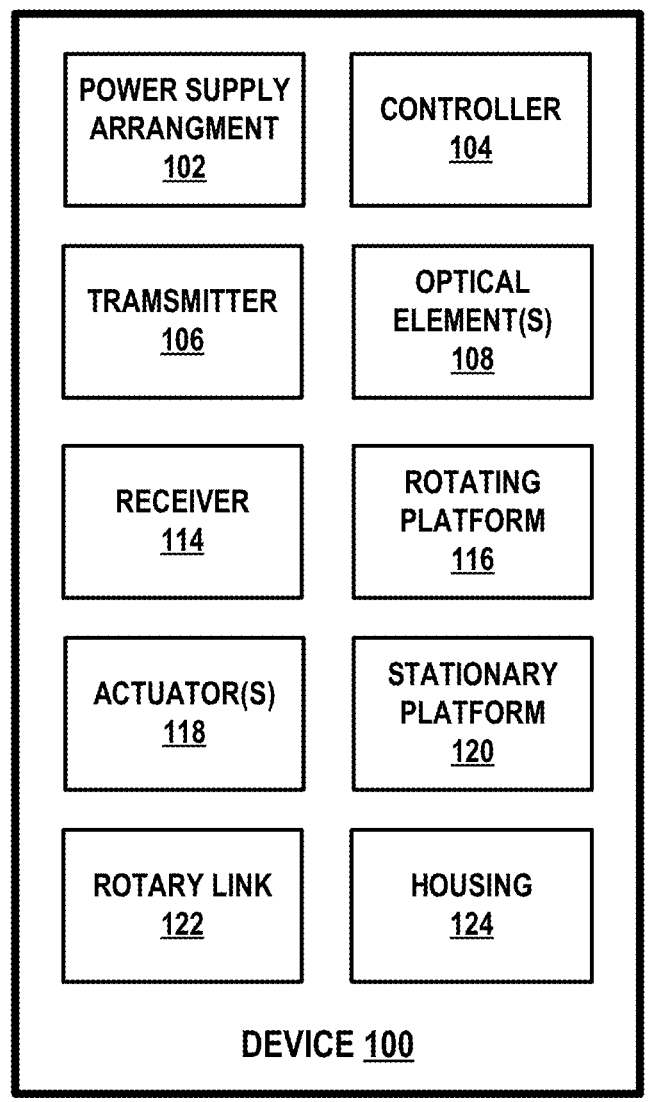
FIG. 1 is a simplified block diagram of a device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. Overview

There are continued efforts to improve vehicle safety and/or autonomous operation, including the development of vehicles equipped with accident-avoidance systems and remote sensing capabilities. To that end, various types of active sensors, such as LIDARs, RADARs, SONARs, etc., may be included in a vehicle to detect obstacles or objects in an environment of the vehicle and thereby facilitate accident avoidance and/or autonomous operation, among other possibilities.

As sensor-equipped vehicles become more prevalent, various operational scenarios may affect operation of the respective sensors. In one example scenario, multiple LIDAR-equipped vehicles may be proximally located with respect to one another. In this scenario, light pulses emitted by a LIDAR of a first vehicle may be received by a LIDAR of a second vehicle. Further, in this scenario, the second vehicle may interpret the light pulse emitted by the LIDAR of the first vehicle as a reflection of another light pulse emitted by the LIDAR of the second vehicle. Thus, such interference between vehicle-mounted LIDARs may affect the reliability and/or quality of the scans performed using the respective LIDARs.

To reduce such interference, some example implementations herein provide for synchronization of various sensor and vehicle operations. One example implementation involves a vehicle that includes a LIDAR device and a communication interface (e.g., wireless communication system, sensor antennas, etc.). The communication interface may receive timing information from an external clock source. For example, the timing information may include a global positioning system (GPS) clock signal, a network time protocol (NTP) reference clock signal, or a time signal from a cellular communication network, among other possibilities. The vehicle may also include a controller that operates an actuator to adjust a pointing direction of the LIDAR device based on at least the timing information received from the external clock source. Further, the external clock source can be employed as a common reference clock signal that is used by multiple LIDAR-equipped vehicles.

With this arrangement, for instance, multiple LIDAR-equipped vehicles located in a given area can rely on the common clock signal to align their respective LIDAR pointing directions in a similar direction at any given time. For example, vehicle-mounted rotating LIDARs can use the common clock signal as a timing signal to establish a common frequency and phase of the rotation of the respective LIDARs relative to the environment. In an example scenario, at time t=0 seconds, multiple vehicle LIDARs can be pointed toward a first direction (e.g., geographic North), and at time t=T/2 (where T is a period of rotation of the LIDARs), the respective LIDARs may be pointed toward a second, opposite direction (e.g., geographic South). Thus, in this scenario, the likelihood of interference between the respective vehicle-mounted LIDARs can be reduced.

In some examples, the vehicle may include one or more sensors (e.g., inertial measurement unit (IMU), gyroscope, accelerometer, compass, etc.) that provide an indication of an orientation of the vehicle in the environment. For instance, one example sensor (e.g., yaw sensor) may indicate a measurement of a yaw direction (e.g., direction of travel of a car on a road, etc.) of the vehicle. Thus, if two vehicles are travelling along different yaw directions (e.g., at a street intersection, opposite lanes of a road, etc.), then the two vehicles can use their respective yaw direction measurements to adjust their respective LIDAR pointing directions toward a similar direction relative to the environment.

In some examples, the vehicle (or the LIDAR device) may include one or more sensors (e.g., encoders, IMUs, gyroscopes, accelerometers, etc.) that provide an indication of an orientation of the LIDAR device relative to the vehicle. One example sensor (e.g., gyroscope, etc.) may indicate a measurement of a frequency of rotation of the LIDAR device about an axis. Another example sensor (e.g., encoder, etc.) may indicate a position of the LIDAR device about the axis. By way of example, consider a scenario where the LIDAR device is rotating in a clockwise direction at a frequency of 15 Hz (15 revolutions per second). In this scenario, if the vehicle performs a right turn maneuver (e.g., detected based on a yaw sensor of the vehicle), the vehicle may reduce the frequency of rotation of the LIDAR device by an amount similar to the rate of change to the yaw direction of the vehicle (e.g., to a frequency less than 15 Hz). By doing so, for instance, the vehicle can mitigate or prevent variations in the effective frequency of rotation of the LIDAR device relative to the environment before, during, and/or after the right turn driving maneuver. As a result, for instance, the pointing direction of the LIDAR device (while the vehicle is performing the maneuver) may continue to be similar to the pointing directions of other vehicle-mounted LIDARs, at least with respect to the environment. Further, for instance, by adjusting the LIDAR spinning rate relative to Earth, the actuator rotating the LIDAR may be associated with a lower control effort (e.g., fewer/lower actuator torque changes) to keep the LIDAR rotating at a target rate. Whereas, if the target LIDAR spinning rate is instead relative to the vehicle for instance, more accelerations/decelerations of the LIDAR spinning rate may be associated with the actuator in some scenarios where the vehicle is turning. Other advantages are possible as well.

Other example vehicle and sensor configurations/operations are possible as well, in accordance with the present disclosure. For example, another type of active sensor can be mounted to the vehicle in addition to or instead of the LIDAR device. To that end, one or more implementations herein may involve adjusting a pointing direction of a signal emitted by a vehicle-mounted active sensor (e.g., radio-frequency signal emitted by a RADAR, sound-frequency signal emitted by a SONAR, microwave-frequency signal emitted by a microwave sensor, infrared-frequency signals emitted by an active IR camera, etc.) according to timing information (e.g., reference clock signal, etc.) obtained from an external source. Further, for instance, other similar active sensors (which may be mounted to the same vehicle or to other vehicles) can also use the timing information from the same external clock source to adjust their respective pointing directions. Thus, in some examples, a likelihood of interference between active sensors (whether or not they are mounted on the same vehicle) can be reduced, in line with the discussion above.

II. Example Sensors

A non-exhaustive list of example sensors that can be employed herein includes LIDAR sensors, RADAR sensors, SONAR sensors, active IR cameras, and microwave cameras, among others. To that end, some example sensors herein may include an active sensor that emits a signal (e.g., visible light signal, invisible light signal, radio-frequency signal, microwave signal, sound signal, etc.) based on modulated power provided to the sensor, and then detects reflections of the emitted signal from objects in the surrounding environment.

FIG. 1 is a simplified block diagram of a device 100, according to an example embodiment. As shown, device 100 includes a power supply arrangement 102, a controller 104, a transmitter 106, one or more optical elements 108, a receiver 114, a rotating platform 116, one or more actuators 118, a stationary platform 120, a rotary link 122, and a housing 124. In other embodiments, device 100 may include more, fewer, or different components. For example, device 100 can optionally include one or more sensors (e.g., gyroscopes, accelerometers, encoders, etc.) that indicate a measurement of an orientation of the device 100. Additionally, the components shown may be combined or divided in any number of ways.

Power supply arrangement 102 may be configured to supply, receive, and/or distribute power to various components of device 100. To that end, power supply arrangement 102 may include or otherwise take the form of a power source (e.g., battery cells, etc.) disposed within device 100 and connected to various components of the device 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which device 100 is mounted) and to transmit the received power to various components of device 100.

Controller 104 may include one or more electronic components and/or systems arranged to facilitate certain operations of device 100. Controller 104 may be disposed within device 100 in any feasible manner. In one embodiment, controller 104 may be disposed, at least partially, within a central cavity region of rotary link 122.

In some examples, controller 104 may include or otherwise be coupled to wiring used for transfer of control signals to various components of device 100 and/or for transfer of data from various components of device 100 to controller 104. Generally, the data that controller 104 receives may include sensor data based on detections of signals by receiver 114, among other possibilities. Moreover, the control signals sent by controller 104 may operate various components of device 100, such as by controlling emission of signals by transmitter 106, controlling detection of signals by the receiver 114, and/or controlling actuator(s) 118 to rotate rotating platform 116, among other possibilities.

To that end, in some examples, controller 104 may include one or more processors, data storage, and program instructions (stored on the data storage) executable by the one or more processors to cause device 100 to perform the various operations described herein. In some instances, the controller may communicate with an external controller or the like (e.g., a computing system arranged in a vehicle to which device 100 is mounted) so as to help facilitate transfer of control signals and/or data between the external controller and the various components of device 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 118 to cause the rotating platform to rotate at a particular frequency or phase. Other examples are possible as well.

Transmitter 106 may be configured to transmit a signal toward an environment of device 100.

In a first example, where device 100 is configured as a LIDAR device, transmitter 106 may include one or more light sources that emit one or more light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers. In some implementations, the one or more light sources in transmitter 106 may include laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where device 100 is configured as an active infrared (IR) camera, transmitter 106 may be configured to emit IR radiation to illuminate a scene. To that end, transmitter 106 may include any type of device (e.g., light source, etc.) configured to provide the IR radiation.

In a third example, where device 100 is configured as a RADAR device, transmitter 106 may include one or more antennas configured to emit a modulated radio-frequency (RF) signal toward an environment of device 100.

In a fourth example, where device 100 is configured as a SONAR device, transmitter 106 may include one or more acoustic transducers, such as piezoelectric transducers, magnetostrictive transducers, electrostatic transducers, etc., configured to emit a modulated sound signal toward an environment of device 100. In some implementations, the acoustic transducers can be configured to emit sound signals within a particular wavelength range (e.g., infrasonic, ultrasonic, etc.). Other examples are possible as well.

Optical element(s) 108 can be optionally included in or otherwise coupled to transmitter 106 and/or receiver 114. In one example, optical element(s) 108 can be arranged to direct light from a light source in transmitter 106 toward the environment. In another example, optical element(s) 108 can be arranged to focus light from the environment toward receiver 114. As such, optical element(s) may include any feasible combination of mirror(s) used to guide propagation of light through physical space and/or lens(es) used to adjust certain characteristics of the light, among other optical components.

Receiver 114 may include one or more detectors configured to detect reflections of the signal emitted by transmitter 106.

In a first example, where device 100 is configured as a RADAR device, receiver 114 may include one or more antennas configured to detect reflections of the RF signal transmitted by transmitter 106. To that end, in some implementations, the one or more antennas of transmitter 106 and receiver 114 can be physically implemented as the same physical antenna structures.

In a second example, where device 100 is configured as a SONAR device, receiver 114 may include one or more sound sensors (e.g., microphones, etc.) that are configured to detect reflections of the sound signals emitted by transmitter 106.

In a third example, where device 100 is configured as an active IR camera, receiver 114 may include one or more light detectors (e.g., charge-coupled devices (CCDs), etc.) that are configured to detect a source wavelength of IR light transmitted by transmitter 106 and reflected off a scene toward receiver 114.

In a fourth example, where device 100 is configured as a LIDAR device, receiver 114 may include one or more light detectors (e.g., photodiodes, avalanche photodiodes, etc.) that are arranged to intercept and detect reflections of the light pulses emitted by transmitter 106 and reflected from one or more objects in a surrounding environment of device 100. To that end, receiver 114 may be configured to detect light having wavelengths in the same wavelength range as the light emitted by transmitter 106. In this way, for instance, device 100 may distinguish reflected light pulses originated by device 100 from other light in the environment.

In some instances, receiver 114 may include a photodetector array, which may include one or more detectors each configured to convert detected light (e.g., in the above-mentioned wavelength range) into an electrical signal indicative of the detected light. In practice, such a photodetector array could be arranged in one of various ways. For instance, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. Additionally, the detectors in the array may take various forms. For instance, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the emitted light.

In some implementations, device 100 (e.g., in a LIDAR device configuration) can select or adjust a horizontal scanning resolution by changing a rate of rotation of device 100 (and/or transmitter 106 and receiver 114). Additionally or alternatively, for example, the horizontal scanning resolution can be modified by adjusting a pulse rate of light pulses emitted by transmitter 106. In one particular implementation, transmitter 106 can be configured to emit light pulses at a pulse rate of 15,650 light pulses per second. In this example, device 100 may be configured to rotate at 10 Hz (i.e., ten complete 360° rotations per second). As such, receiver 114 can detect light with a 0.23° horizontal angular resolution. The horizontal angular resolution of 0.23° can be adjusted by changing the rate of rotation of device 100 or by adjusting the pulse rate. For instance, if device 100 is instead rotated at 20 Hz, the horizontal angular resolution may become 0.46°. Alternatively, if transmitter 106 emits the light pulses at a rate of 31,300 light pulses per second while maintaining the rate of rotation of 10 Hz, then the horizontal angular resolution may become 0.115°. In other examples, device 100 can be alternatively configured to scan a particular range of views within less than a complete 360° rotation of device 100. Other implementations are possible as well.

Rotating platform 116 may be configured to rotate about an axis. To that end, rotating platform 116 can be formed from any solid material suitable for supporting one or more components mounted thereon. For example, transmitter 106 and receiver 114 may be arranged on rotating platform 116 such that each of these components moves relative to the environment based on rotation of rotating platform 116. In particular, each of these components could be rotated relative to an axis so that device 100 may obtain information from various directions. In this manner, a pointing direction of device 100 can be adjusted horizontally by actuating the rotating platform 114 to different directions.

In order to rotate platform 116 in this manner, one or more actuators 118 may actuate the rotating platform 114. To that end, actuators 118 may include motors, pneumatic actuators, hydraulic pistons, and/or piezoelectric actuators, among other possibilities.

With this arrangement, controller 104 could operate actuator 118 to rotate rotating platform 116 in various ways so as to obtain information about the environment. In one example, rotating platform 116 could be rotated in either direction. In another example, rotating platform 116 may carry out complete revolutions such that device 100 provides a 360° horizontal FOV of the environment. Moreover, rotating platform 116 could rotate at various frequencies so as to cause device 100 to scan the environment at various refresh rates. In one embodiment, device 100 may be configured to have a refresh rate of 10 Hz (e.g., ten complete rotations of device 100 per second).

Alternatively or additionally, device 100 may be configured to adjust the pointing direction of the emitted signal (emitted by transmitter 106) in various ways. In one implementation, signal sources (e.g., light sources, antennas, acoustic transducers, etc.) of transmitter 106 can be operated according to a phased array configuration or other type of beam steering configuration.

In a first example, where device 100 is configured as a LIDAR device, light sources in transmitter 106 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 106 (e.g., even if rotating platform 116 is not rotating).

In a second example, where device 100 is configured as a RADAR device, transmitter 106 may include an array of antennas, and controller 104 can provide respective phase-shifted control signals for each individual antenna in the array to modify a pointing direction of a combined RF signal from the array (e.g., phased array beam steering).

In a third example, where device 100 is configured as a SONAR device, transmitter 106 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if the rotating platform 116 is not rotating, etc.). Other examples are possible.

Stationary platform 120 may take on any shape or form and may be configured for coupling to various structures, such as to a top of a vehicle, a robotic platform, a robotic platform, assembly line machine, or any other system that employs device 100 to scan its surrounding environment, for example. Also, the coupling of the stationary platform may be carried out via any feasible connector arrangement (e.g., bolts and/or screws). In this way, device 100 could be coupled to a structure so as to be used for various purposes, such as those described herein.

Rotary link 122 directly or indirectly couples stationary platform 120 to rotating platform 116. To that end, rotary link 122 may take on any shape, form and material that provides for rotation of rotating platform 116 about an axis relative to the stationary platform 120. For instance, rotary link 122 may take the form of a shaft or the like that rotates based on actuation from actuator 118, thereby transferring mechanical forces from actuator 118 to rotating platform 116. In one implementation, rotary link 122 may have a central cavity in which one or more components of device 100 may be disposed. In some examples, rotary link 122 may also provide a communication link for transferring data and/or instructions between stationary platform 120 and rotating platform 116 (and/or components thereon such as transmitter 106 and receiver 114).

Housing 124 may take on any shape, form, and material and may be configured to house one or more components of device 100. For example, housing 124 can be a dome-shaped housing. Further, for example, housing 124 may be composed of a material that is at least partially non-transparent, which may allow for blocking of at least some signals from entering the interior space of the housing 124 and thus help mitigate thermal and noise effects of ambient signals on one or more components of device 100. Other configurations of housing 124 are possible as well.

In some examples, housing 124 may be coupled to rotating platform 116 such that housing 122 is configured to rotate about the above-mentioned axis based on rotation of rotating platform 116. With this implementation, transmitter 106, receiver 114, and possibly other components of device 100 may each be disposed within housing 124. In this manner, transmitter 106 and receiver 114 may rotate along with housing 124 while being disposed within housing 124. It is noted that this arrangement of device 100 is described for exemplary purposes only and is not meant to be limiting.

Figure 2:
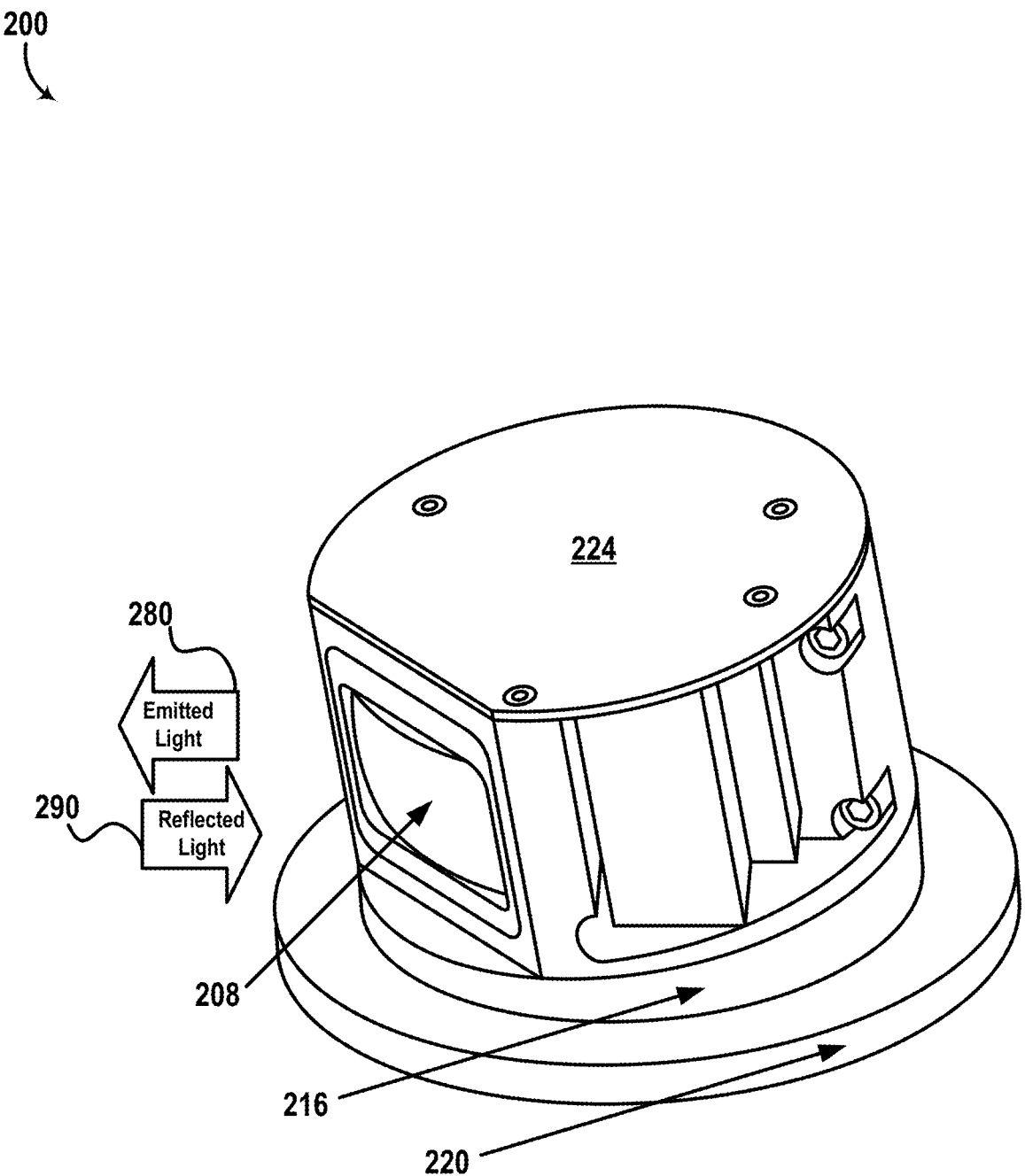
FIG. 2 illustrates a LIDAR device, according to an example embodiment.

FIG. 2 illustrates a LIDAR device 200, according to an example embodiment. In some examples, LIDAR 200 may be similar to device 100. For example, as shown, LIDAR device 200 includes a lens 208, a rotating platform 216, a stationary platform 220, and a housing 224 which may be similar, respectively, to optical element 108, rotating platform 216, stationary platform 120, and housing 124. Additionally, as shown, light beams 280 emitted by LIDAR device 200 propagate from lens 108 along a pointing direction of LIDAR 200 toward an environment of LIDAR device 200, and reflect off one or more objects in the environment as reflected light 290.

In some examples, housing 224 can be configured to have a substantially cylindrical shape and to rotate about an axis of LIDAR device 200. In one example, housing 224 can have a diameter of approximately 10 centimeters. Other examples are possible. In some examples, the axis of rotation of LIDAR device 200 is substantially vertical. For instance, by rotating housing 224 that includes the various components a three-dimensional map of a 360-degree view of the environment of LIDAR device 200 can be determined. Additionally or alternatively, in some examples, LIDAR device 200 can be configured to tilt the axis of rotation of housing 224 to control a field of view of LIDAR device 200. Thus, in some examples, rotating platform 216 may comprise a movable platform that may tilt in one or more directions to change the axis of rotation of LIDAR device 200.

In some examples, lens 208 can have an optical power to both collimate the emitted light beams 280, and focus the reflected light 290 from one or more objects in the environment of LIDAR device 200 onto detectors in LIDAR device 200. In one example, lens 208 has a focal length of approximately 120 mm. Other example focal lengths are possible. By using the same lens 208 to perform both of these functions, instead of a transmit lens for collimating and a receive lens for focusing, advantages with respect to size, cost, and/or complexity can be provided. Alternatively, LIDAR 200 may include separate transmit and receive lenses.

III. Example Vehicles

Some example implementations herein involve a sensor, such as devices 100 and 200 for instance or another type of sensor (e.g., RADAR, SONAR, camera, another type of active sensor, etc.), mounted to a vehicle. However, an example sensor disclosed herein can also be used for various other purposes and may be incorporated on or otherwise connected to any feasible system or arrangement. For instance, an example LIDAR device can be used in an assembly line setting to monitor objects (e.g., products) being manufactured in the assembly line. Other examples are possible as well. Additionally, although illustrative embodiments herein include a LIDAR device mounted on a car, an example LIDAR device may additionally or alternatively be used on any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 3:
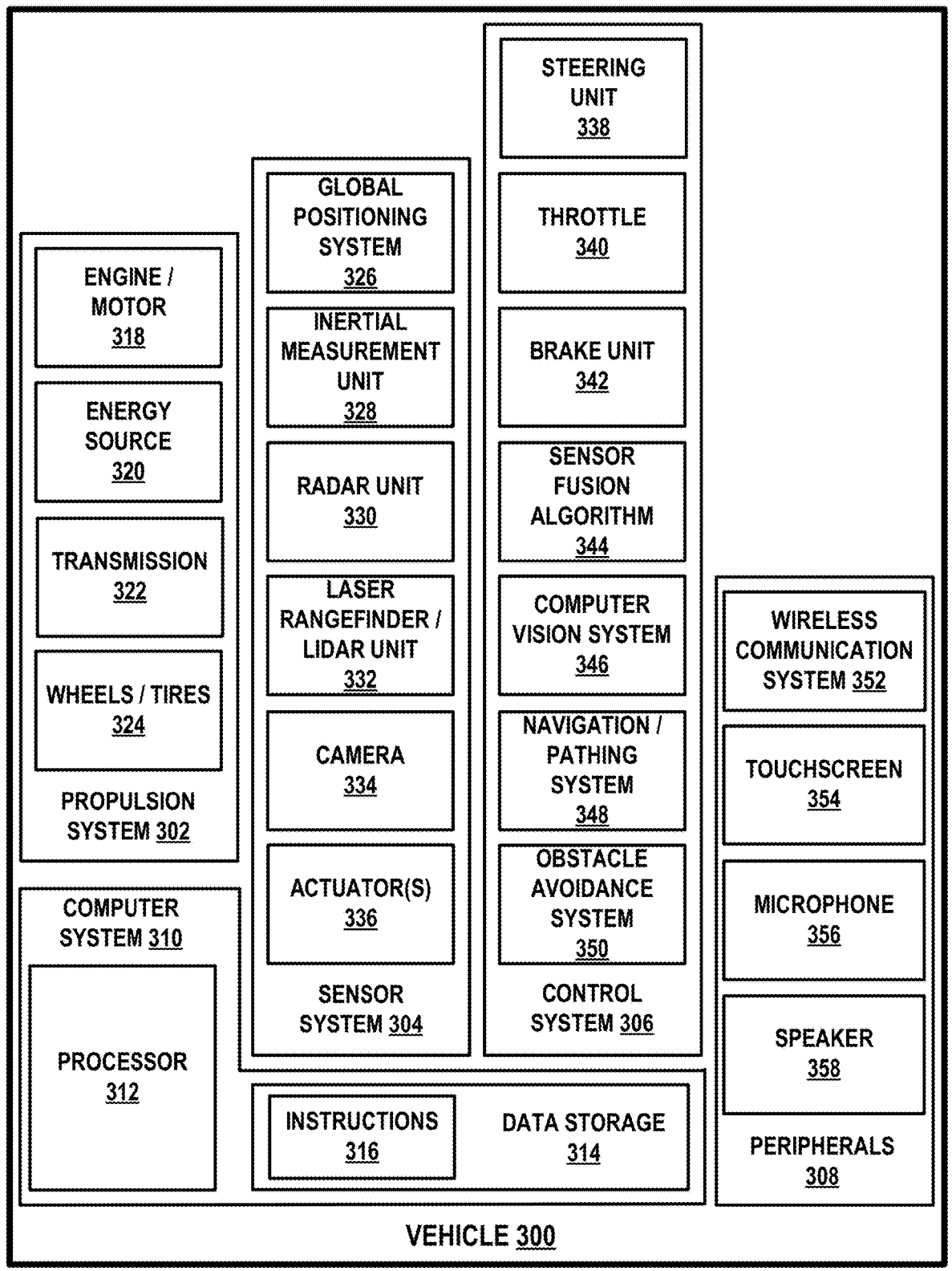
FIG. 3 is a simplified block diagram of a vehicle, according to an example embodiment.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of devices 100 and/or 200 among other LIDAR device configurations, for instance.

Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

FIGS. 4A-4D collectively illustrate a vehicle 400 equipped with a LIDAR device 410, according to example embodiments. Vehicle 400 may be similar to vehicle 300, for example. Although vehicle 400 is illustrated as a car, as noted above, other types of vehicles are possible. Furthermore, although vehicle 400 may be configured to operate in autonomous mode, the embodiments described herein are also applicable to vehicles that are not configured to operate autonomously.

Figure 4A:
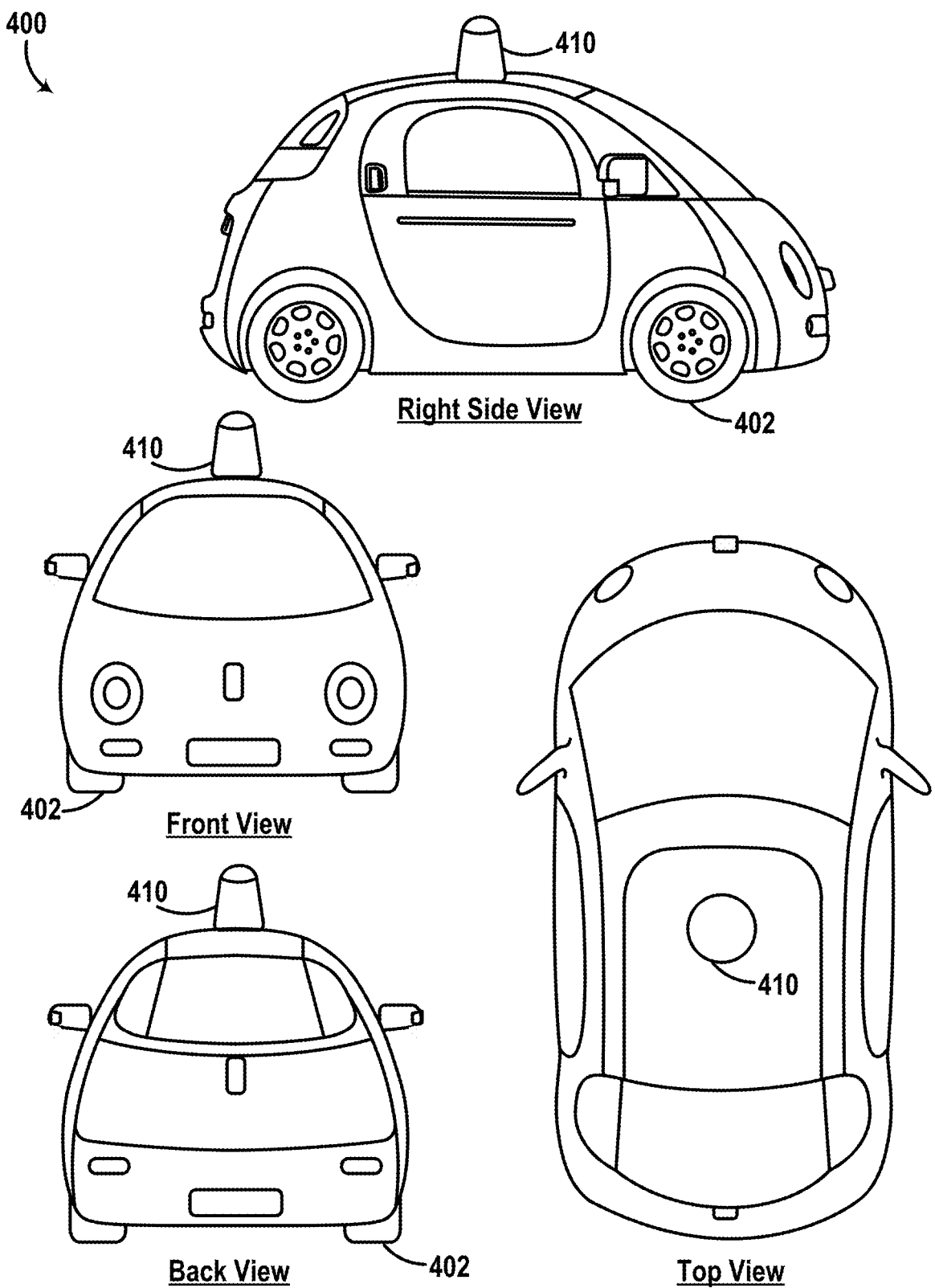
FIG. 4A illustrates several views of a vehicle equipped with a LIDAR device, according to an example embodiment.

FIG. 4A shows a Right Side View, Front View, Back View, and Top View of vehicle 400. As shown, vehicle 400 includes a LIDAR device 410 mounted on a top side of vehicle 400 opposite a bottom side on which wheels of vehicle 400, exemplified by wheel 402, are located. LIDAR device 410 may be similar to devices 100 and/or 200, for example. Although LIDAR device 410 is shown and described as being positioned on a top side of vehicle 400, LIDAR device 410 could be alternatively positioned on any other part of vehicle 400, including any other side of vehicle 400 for instance.

Figure 4B:
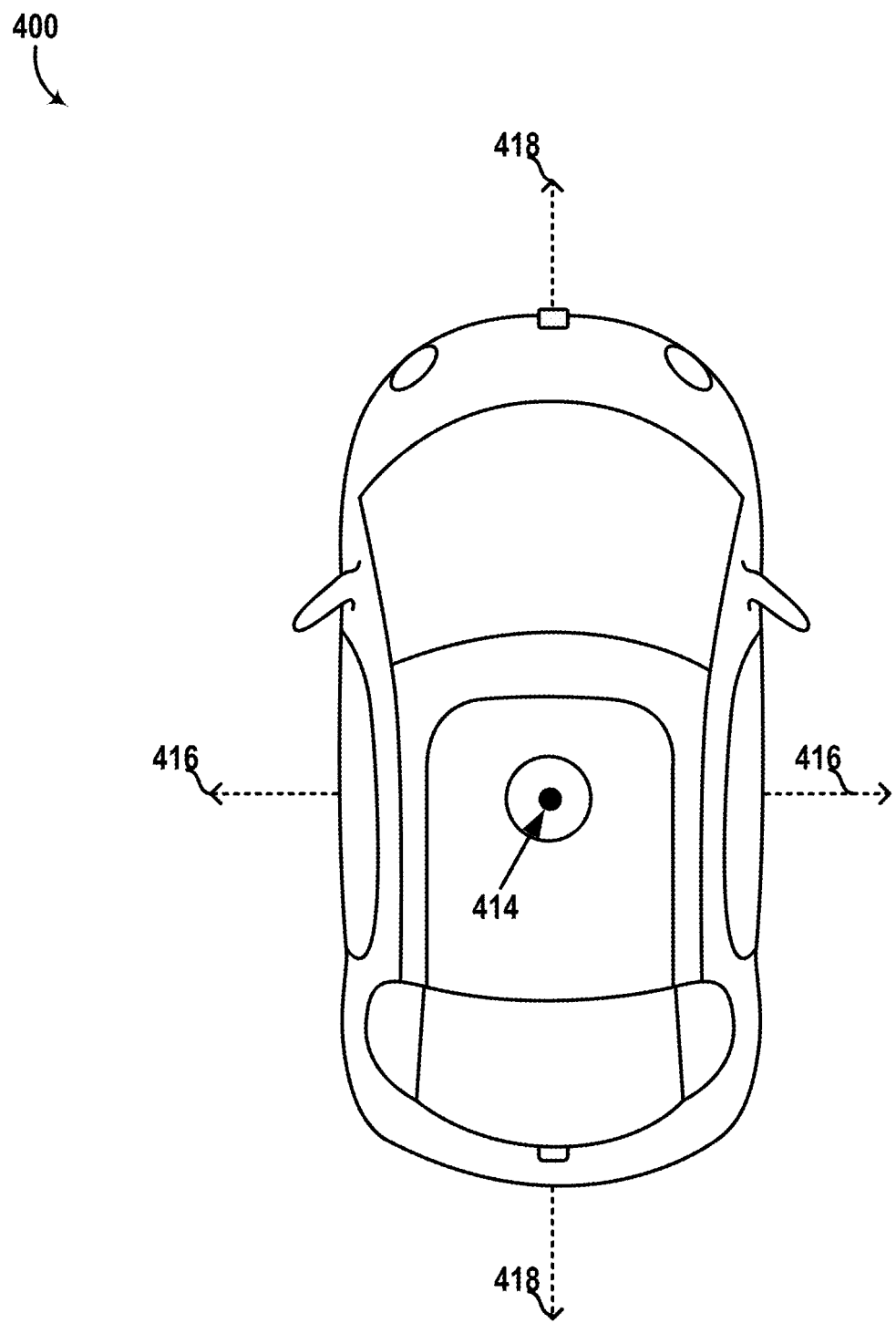
FIG. 4B illustrates a top view of the vehicle.

FIG. 4B illustrates another top view of vehicle 400. In some scenarios, vehicle 400 may rotate about one or more axes, which are shown as yaw axis 414, pitch axis 416, and roll axis 418. Yaw axis 414 may correspond to a height-wise axis extending through the top of the vehicle (and out of the page). In an example scenario, a yaw rotation of vehicle 400 about yaw axis 414 may correspond to adjusting a pointing or heading direction of vehicle 400 (e.g., direction of motion or travel along a driving surface, etc.).

Pitch axis 416 may correspond to a rotational axis that extends widthwise through the right side and left side of vehicle 400. In an example scenario, a pitch rotation of vehicle 400 about pitch axis 416 may result from an acceleration or deceleration (e.g., application of brakes, etc.) of vehicle 400. For instance, a deceleration of the vehicle may cause the vehicle to tilt toward the front side of the vehicle (i.e., pitch rotation about pitch axis 416). In this scenario, front wheel shocks (not shown) of 400 may compress to absorb the force due to the change of momentum of the vehicle, and back wheel shocks (not shown) may expand to allow the vehicle to tilt toward the front side. In another example scenario, a pitch rotation of vehicle 400 about pitch axis 416 may result from vehicle 400 traveling along a sloped driving surface (e.g., hill, etc.), thereby causing vehicle 400 to tilt upwards or downwards (i.e., pitch-wise) depending on the slope of the driving surface. Other scenarios are possible as well.

Roll axis 418 may correspond to a rotational axis that extends lengthwise through the front side and the back side of vehicle 400. In an example scenario, a roll rotation of vehicle 400 about roll axis 418 may occur in response to the vehicle performing a turning maneuver. For instance, if the vehicle performs a sudden right turn maneuver, the vehicle may bank toward the left side (i.e., roll rotation about roll axis 418) in response to a force caused by the changing momentum of the vehicle or a centripetal force acting on the vehicle due to the maneuver, etc. In another example scenario, a roll rotation of vehicle 400 about roll axis 418 may occur as a result of vehicle 400 traveling along a curved driving surface (e.g., road camber, etc.), which may cause vehicle 400 to tilt sideways (i.e., roll-wise) depending on the curvature of the driving surface. Other scenarios are possible as well.

It is noted that the positions of the various rotational axes 414, 416, 418 may vary depending on various physical characteristics of vehicle 400, such as the location of a center of gravity of the vehicle, locations and/or mounting positions of wheels of the vehicle, etc. To that end, the various axes 414, 416, 418 are illustrated as shown only for the sake of example. Thus, for instance, roll axis 418 can be alternatively positioned to have a different path through the front side and back side of vehicle 400, and yaw axis 414 may extend through a different region of the top side of vehicle 400 than that shown, etc.

Figure 4C:
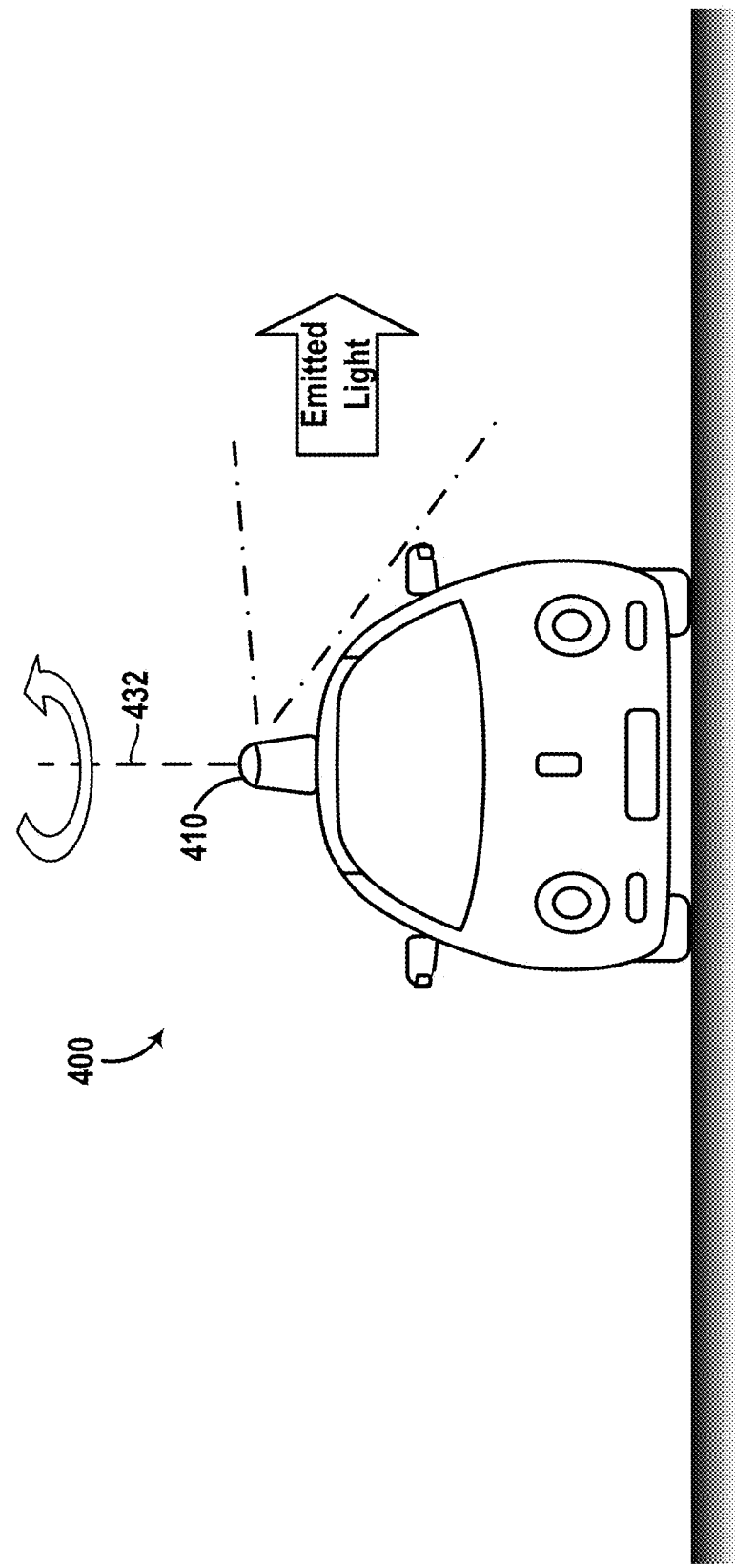
FIG. 4C illustrates an example operation of the LIDAR device.

FIG. 4C shows that LIDAR device 410 may be configured to scan an environment around vehicle 400 by rotating about vertical axis 432, while emitting one or more light pulses and detecting reflected light pulses off objects in an environment of vehicle 400, for example.

Thus, as shown, LIDAR device 410 may emit light in a pointing direction of LIDAR 410, which is shown as a pointing direction toward a right side of the page for example. With this arrangement, LIDAR device 410 can emit light toward regions of the environment that are relatively close to the vehicle (e.g., a lane marker) as well as toward regions of the environment that are further away from the vehicle (e.g., a road sign ahead of the vehicle). Further, vehicle 400 can rotate LIDAR device 410 (or one or more components thereof) about axis 432 to change the pointing direction of LIDAR device 410. In one example, vehicle 400 may rotate LIDAR device 410 about axis 432 repeatedly for complete rotations. In this example, for each complete rotation of LIDAR device 410 (or one or more components thereof), LIDAR device 410 can scan a 360° FOV around vehicle 400. In another example, vehicle 400 may rotate LIDAR device 410 about axis 432 for less than a complete rotation (e.g., to scan a limited horizontal FOV rather than a complete 360° FOV).

Figure 4D:
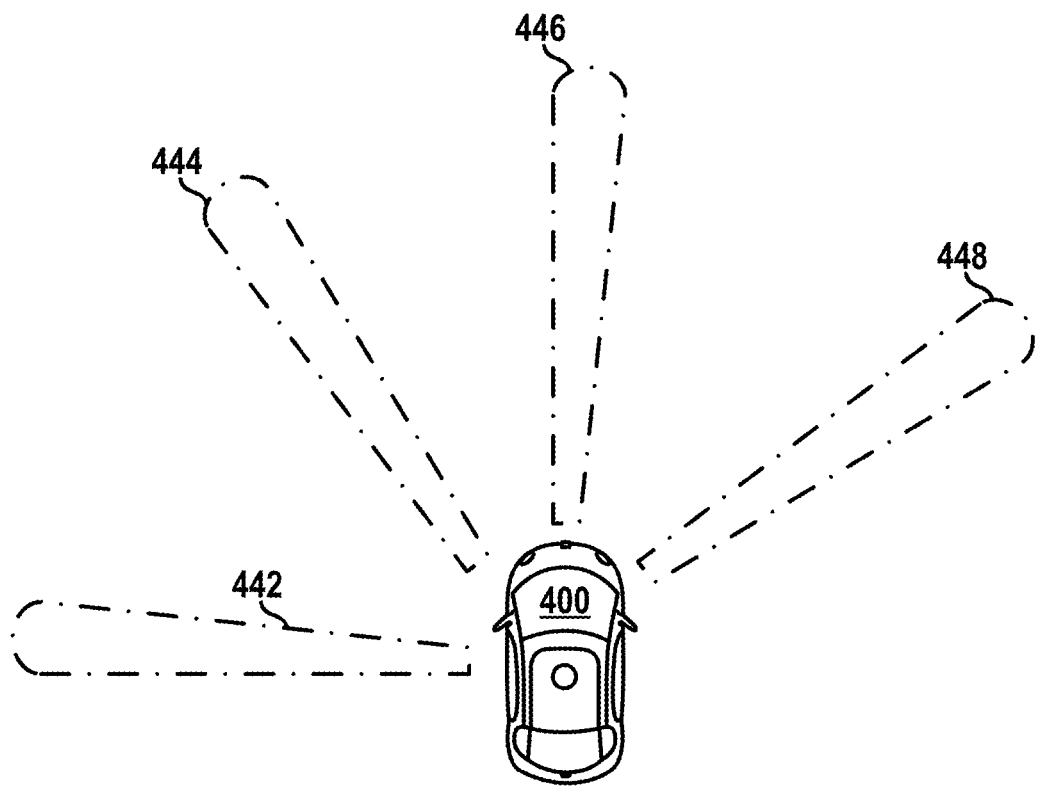
FIG. 4D illustrates another example operation of the LIDAR device.

FIG. 4D is an illustration of vehicle 400 scanning the surrounding environment using LIDAR device 410, according to an example embodiment. As shown, each of contours 442, 444, 446, and 448 may correspond to respective FOVs that are scanned when LIDAR device 410 is directed in the corresponding pointing directions. By way of example, contour 442 may correspond to a region of the environment scanned by LIDAR device 410 when LIDAR device 410 is in a first pointing direction toward the left side of the page. For instance, objects inside of contour 442 may be within a range of distances suitable for proper detection and/or identification using data from LIDAR device 410 while positioned in the first pointing direction. Further, in this example, when LIDAR device 410 is rotated to a second pointing direction toward the top of the page, LIDAR device 410 can then scan the region of the environment indicated by contour 446. It is noted that these contours are not to scale and not intended to represent actual contours of a LIDAR FOV, but instead are illustrated as shown for convenience of description.

In some examples, LIDAR device 410 may be configured to rotate repeatedly about axis 432 at a given frequency (f). For instance, in an example scenario where f=15 Hz, LIDAR device 410 may have the first pointing direction (associated with contour 442) fifteen times every second, i.e., after every given period (T=1/f) of time from a previous time when LIDAR device 410 was at the first pointing direction. Thus, in this scenario, at time t=0, LIDAR device 410 may be at the first pointing direction associated with contour 442. Further, in this scenario, at time t=T/4, LIDAR device 410 may be at the second pointing direction associated with contour 446 (e.g., one quarter of a complete rotation about axis 432, etc.).

As a variation of the scenario above, LIDAR device 410 may alternatively be at a third pointing direction associated with contour 444 at time t=0. In this scenario, at time t=T/4, LIDAR device 410 may thus be at a fourth pointing direction associated with contour 448 instead of the second pointing direction associated with contour 446. Thus, in this scenario, the phase of the rotation of LIDAR device 410 about axis 432 may differ from the phase of the rotation in the previous scenario. The difference between the two phases may be due to various reasons. For example, the initial position (e.g., at time t=0) may depend on various factors such as when the LIDAR device 410 begins rotating about axis 432 (e.g., the time at which vehicle 400 provides power to LIDAR device 410, etc.). Other factors are possible as well.

In some scenarios, as noted above, this variation in phase and/or variations in the relative direction (e.g., yaw direction, etc.) of vehicle 400 may cause signals from LIDAR device 410 to interfere with another LIDAR device mounted to another nearby vehicle.

Figure 5:
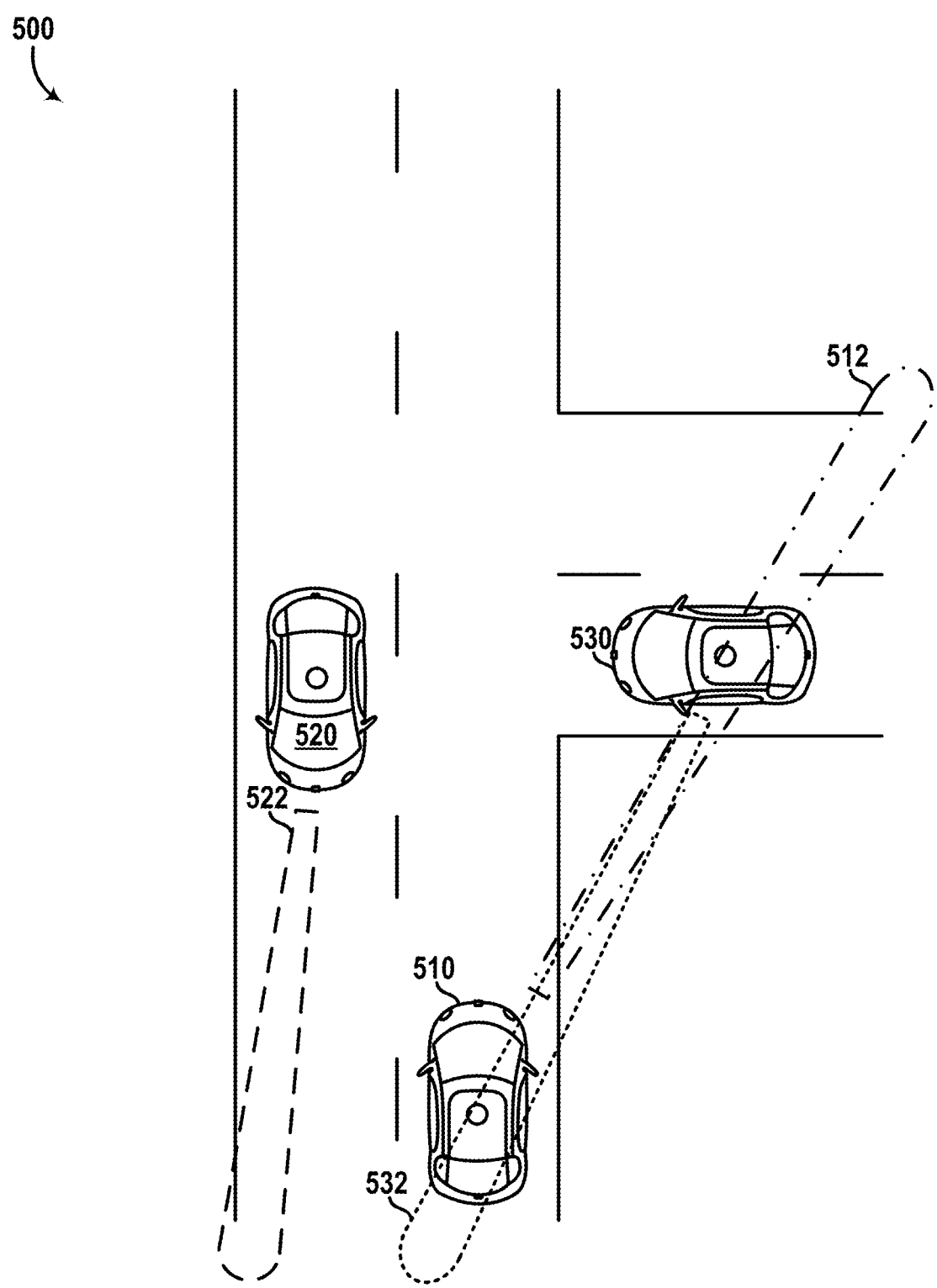
FIG. 5 illustrates a scenario where multiple vehicles are operating in an environment, according to an example embodiment.

FIG. 5 illustrates a scenario where multiple vehicles 510, 520, and 530 are operating in an environment 500, according to an example embodiment. For example, each of vehicles 510, 520, and 530 may be similar to vehicles 300 and/or 400. Thus, in the scenario, contours 512, 522, 532 (e.g., similar to any of contours 442, 444, 446, 448) may correspond to respective FOVs scanned by respective vehicle-mounted sensors (e.g., RADAR 330, camera 334, LIDAR 410, etc.) of vehicles 510, 520, 530 at a particular time.

In line with the discussion above, FIG. 5 shows a scenario where the individual vehicle-mounted sensors of vehicles 510, 520, 530 are not synchronized with respect to one another. As shown, for instance, FOV 512 is associated with a first pointing direction of a sensor (e.g., LIDAR, RADAR, SONAR, active IR camera, etc.) mounted on vehicle 510, FOV 522 is associated with a second pointing direction of a sensor mounted on vehicle 520, and FOV 532 is associated with a third pointing direction of a sensor mounted on vehicle 530. Further, where the scenario shown relates to spinning LIDARs mounted on the respective vehicles, the first, second, and third pointing directions of the LIDARS in vehicles 510, 520, 530 (at the particular time of the scenario shown) have different rotation phases with respect to environment 500.

Further, in the scenario shown in FIG. 5, the FOVs 512 and 532 may overlap with one another. This overlap may result in interference between the sensor (e.g., LIDAR, etc.) mounted on vehicle 510 and the sensor mounted on vehicle 530. By way of example, a LIDAR of vehicle 510 may detect light signals emitted from a LIDAR of vehicle 530 (i.e., light signals within contour 532) in addition to or instead of reflections of light signals emitted by the LIDAR of vehicle 510 (i.e., light signals within contour 512). Similarly, the LIDAR of vehicle 530 may detect light signals emitted from the LIDAR of vehicle 510 (i.e., light signals within contour 512) in addition to or instead of reflections of light signals emitted by the LIDAR of vehicle 530 (i.e., light signals within contour 532). In this way, the LIDARs mounted on vehicles 510 and 530 may interfere with each other. As another example, an active IR camera of vehicle 510 may emit IR radiation (within contour 532) that is detected by an active IR camera of vehicle 530 instead of or in addition to reflections of IR radiation emitted by the active IR camera of vehicle 530. Similarly, in this example, the active cameras of vehicles 510 and 530 may interfere with one another.

Further, although contours 512 and 522 are not shown as overlapping in FIG. 5, in this scenario, the contours 512 and 522 may overlap after passage of time. For example, if the sensors mounted on vehicles 510 and 520 rotate (e.g., spin) in opposite directions, then contours 512 and 522 may eventually overlap, thereby causing interference between the sensors of vehicles 510 and 520.

Accordingly, within examples, pointing directions of proximally located vehicle-mounted sensors relative to an environment can be synchronized to mitigate or reduce a likelihood of such interference.

IV. Example Sensor Synchronization

Figure 6:
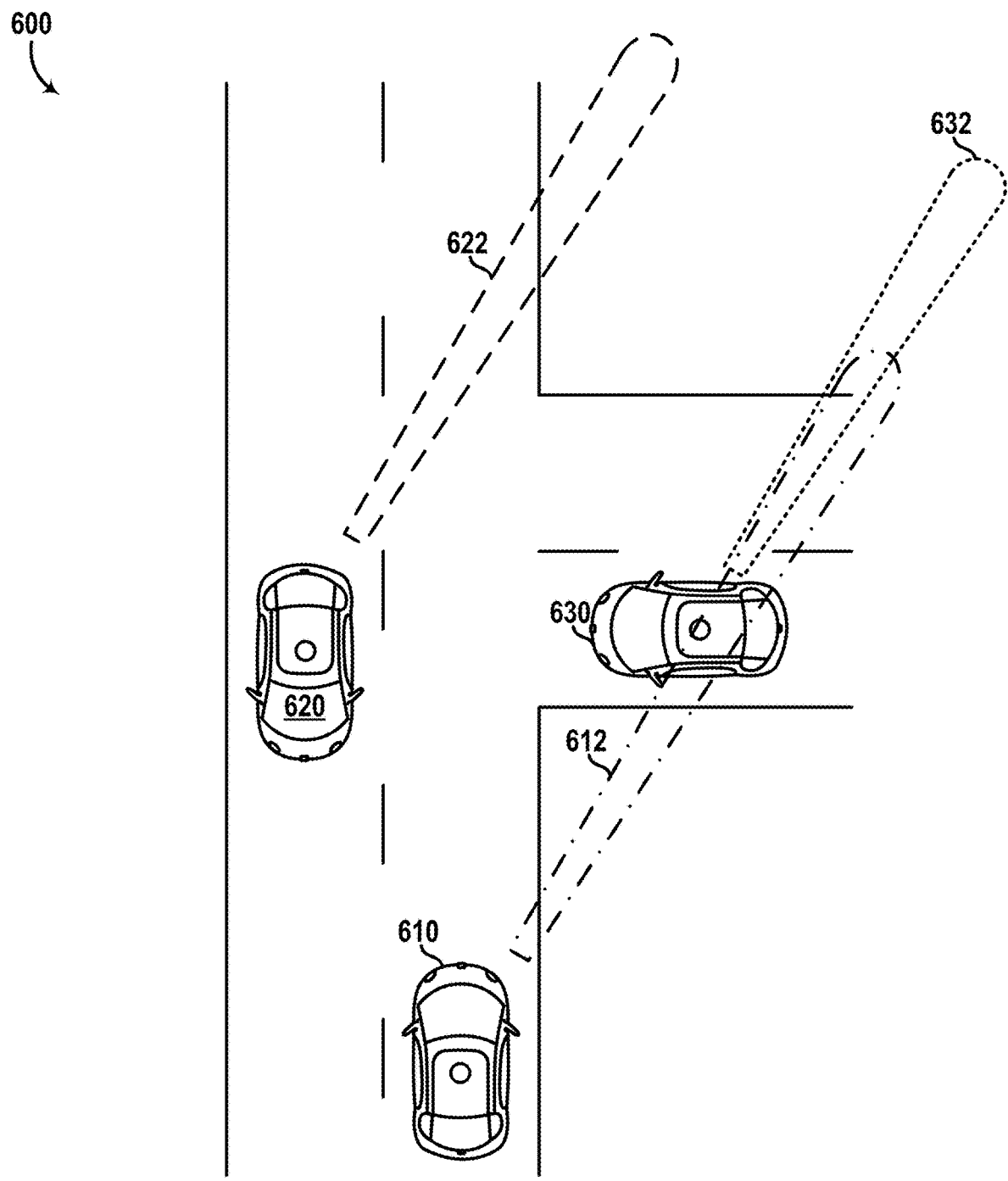
FIG. 6 illustrates another scenario where multiple vehicles are operating in an environment, according to an example embodiment.

FIG. 6 illustrates a scenario where multiple vehicles 610, 620, 630 operating within an environment 600 mount sensors that are synchronized, according to an example embodiment. For example, environment 600, vehicles 610, 620, 630, and contours 612, 622, 632 may be similar, respectively, to environment 500, vehicles 510, 520, 530, and contours 512, 522, 532.

However, unlike the scenario shown in FIG. 5, the sensor pointing directions associated with FOVs 612, 622, 632 are synchronized to correspond to a substantially similar direction relative to environment 600 (at the particular time associated with the scenario of FIG. 6).

In this scenario, for instance, contours 612 and 632 may be associated with substantially similar LIDAR pointing directions relative to environment 600. As a result, although contour 612 overlaps vehicle 630, the LIDAR of vehicle 610 may be less likely to interfere with the LIDAR of vehicle 630. For instance, interference may be more likely to occur when two vehicle-mounted LIDARs are pointing toward one another than if the two LIDARs are pointing in the same directions (or different directions as long as at least one of the two LIDARs is pointing away from the other LIDAR). Referring back to FIG. 2 for example, a lens (e.g., lens 108) of the LIDAR of vehicle 610 may be pointing in a same direction as a lens of the LIDAR of vehicle 630. In this example, light signals from the LIDAR of vehicle 610 (indicated by contour 612) may propagate toward a backside of a housing (e.g., housing 224) of the LIDAR of vehicle 630 (e.g., opposite to a front-side where the lens of the LIDAR of vehicle 630 is located). Thus, in this example, the housing of the LIDAR of vehicle 630 may prevent the light signals from the LIDAR of vehicle 610 from reaching a receiver of the LIDAR of vehicle 630.

Further, the rotation directions of the respective sensors in vehicles 610, 620, 630 can be synchronized to prevent such interference after passage of time. For instance, the sensors of vehicles 610, 620, 630 can be configured to rotate about respective axes in a same direction (e.g., clockwise or counterclockwise) relative to environment 600.

Figure 7:
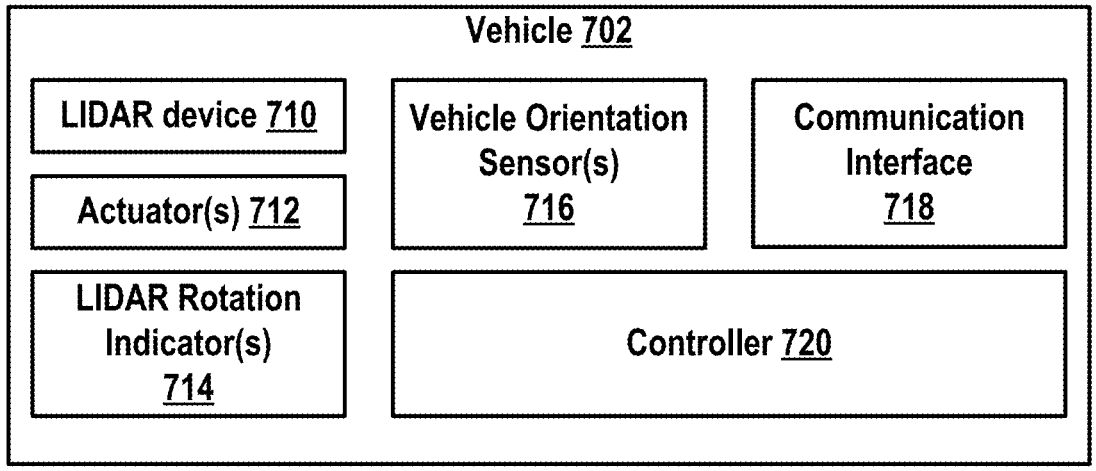
FIG. 7 is a simplified block diagram of a system, according to an example embodiment.
Figure 7:
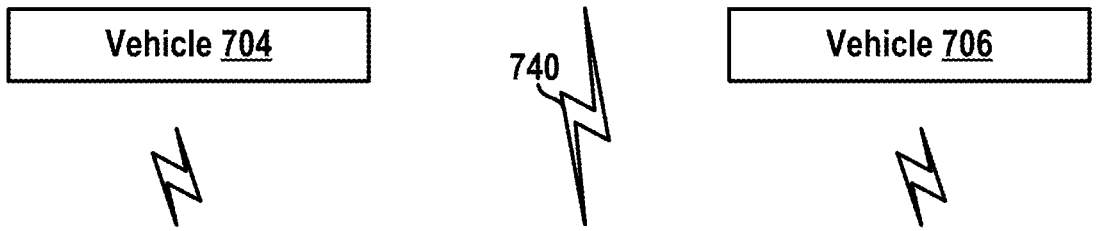
Figure 7:
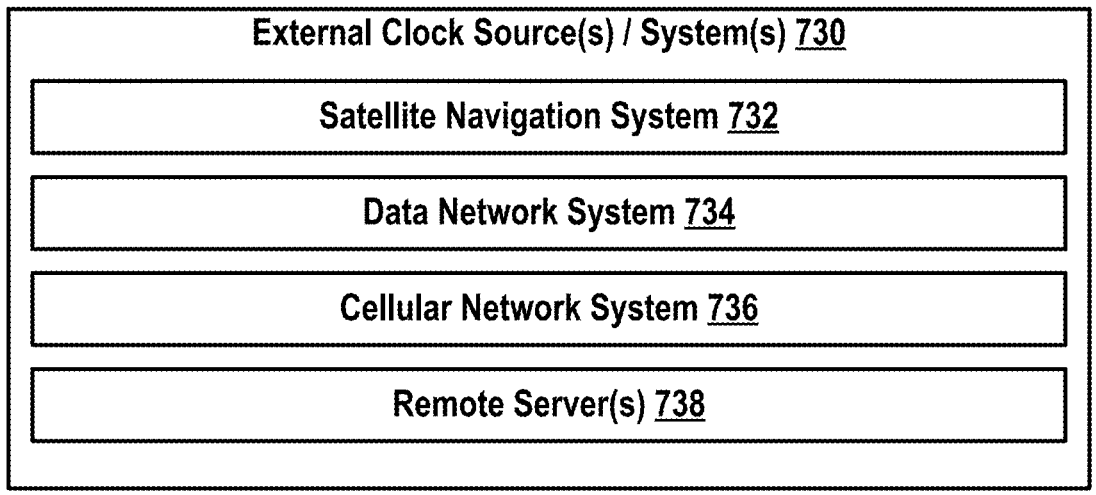

FIG. 7 is a simplified block diagram of a system 700 for synchronizing vehicle-mounted sensors, according to an example embodiment. System 700 illustrates an example system that facilitates the sensor synchronization operations described above for FIG. 6. As shown, system 700 includes vehicles 702, 704, 706 which may be similar to any of the vehicles 300, 400, 510, 520, 530, 610, 620, 630, for example. Further, as shown, system 700 includes external clock source(s)/system(s) 730.

As shown, vehicle 702 includes a LIDAR device 710, one or more actuators 712, one or more LIDAR rotation indicators 714, one or more vehicle orientation sensors 716, a communication interface 718, and a controller 720.

LIDAR device 710 may be similar to any of the devices 100, 200, 332, 410, or any other device (e.g., active sensor, etc.) that emits a signal and detects reflections of the emitted signal to scan a field-of-view (FOV) defined by a pointing direction of the device. Thus, although not shown, vehicles 702, 704, and/or 706 may include other types of sensors in addition to or instead of LIDAR device 710. For example, vehicle 702 may include a RADAR sensor (e.g., RADAR unit 330), a SONAR sensor, an active camera sensor (e.g., a sensor that emits IR or other signal having a source wavelength to illuminate a scene, and detects reflections of the emitted signal to scan the scene, etc.), or any other sensor that scans a FOV. Further, LIDAR device 710 can be mounted to any side of vehicle 702 (e.g., top, right, left, back, etc.).

Actuator(s) 712 may comprise one or more actuators similar to actuator(s) 336. In one implementation, actuator 712 may be configured to rotate LIDAR device 710 (or a rotating platform thereof such as rotating platforms 116, 226) about an axis (e.g., axis 432, etc.). Further, in some implementations, actuator 712 can rotate LIDAR device 710 complete rotations about the axis, or partial rotations about the axis.

LIDAR rotation indicator(s) 714 may comprise any combination of devices that provide an indication of the pointing direction of the LIDAR device 710 (or any other active sensor) relative to the vehicle 702. In one example, indicators 714 may comprise an encoder (e.g., mechanical encoder, optical encoder, magnetic encoder, capacitive encoder, etc.) that measures a position of the LIDAR device 710 about an axis thereof (e.g., axis 432, etc.). For instance, where LIDAR 710 rotates about an axis, the encoder can provide an encoder value indicating an amount of rotation of the LIDAR 710 from an initial (or reference) position about the axis. In another example, indicators 714 may comprise a motion sensor (e.g., compass, gyroscope, accelerometer, IMU 328, etc.) that provides a measurement of motion of the LIDAR 710 (e.g., rotation, etc.) or other type of sensor.

Thus, in some implementations, indicators 714 may include a LIDAR direction indicator that indicates a measurement of the pointing direction of LIDAR device 710 relative to vehicle 702 (e.g., absolute or incremental position relative to a reference pointing direction). Further, in some implementations, indicators 714 may include a LIDAR rotation indicator that indicates a measurement of a rate of change to the pointing direction of LIDAR device 710 relative to vehicle 702 (e.g., gyroscope, etc.).

Vehicle orientation sensor(s) 716 may comprise any combination of sensors that provide an indication of an orientation of vehicle 702 in an environment. For example, sensors 716 may include a direction sensor, such as a gyroscope or compass for instance, that is mounted to vehicle 702 and aligned with a directional axis of vehicle 702 (e.g., axis 414, 416, 418, etc. shown in FIG. 4B). In this example, the direction sensor may provide an indication of a direction of motion of vehicle 702 relative to the environment thereof. For instance, a gyroscope sensor 716 may provide an output signal that indicates a rate of change in a pointing direction of the vehicle (e.g., yaw direction, pitch direction, roll direction, etc.) in the environment in response to motion of the vehicle. Thus, in various examples, sensors 716 may comprise a "yaw sensor" (e.g., compass, etc.) that indicates a measurement of a yaw direction of vehicle 702 (e.g., direction relative to a geographic north, etc.), and/or a "yaw rate sensor" that indicates a measurement of a yaw rate of change to a yaw direction of the vehicle in the environment. Similarly, sensors 716 may include sensors configured as "pitch sensors," "pitch rate sensors," "roll sensors," and/or "roll rate sensors."

Communication interface 718 may include any combination of wired and/or wireless communication systems that facilitate communication between vehicle 702 and external systems such as vehicles 704, 706, and/or clock sources/systems 730.

In one example, interface 718 may include a wireless communication system similar to wireless communication system 352. In this example, communication interface 718 may include one or more antennas and a chipset for communicating with the other vehicles, sensors, servers, or other entities either directly or via a communication network. The chipset or communication interface 718 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

In another example, communication interface 718 may include wired and/or wireless links configured for communication between various components of vehicle 702. In this example, communication interface 718 may include one or more components that facilitate the functions described for rotary link 122 of device 100 for instance.

In yet another example, communication interface 718 may include wired and/or wireless components that facilitate communication for a particular sensor in vehicle 702. For instance, communication interface 718 may include one or more antennas and a chipset accessible to or incorporated within a satellite navigation system (SNS) sensor (not shown), such as GPS 326 of vehicle 300. Thus, in this example, the SNS sensor may operate communication interface 718 to receive timing information from one or more satellites (e.g., external clock source/system 730), and generate a reference clock signal based on the received timing information. Other examples are possible as well.

Controller 720 may comprise one or more general-purpose or special-purpose controllers that operate the various components of vehicle 702 in accordance with the present disclosure. In one implementation, controller 720 may comprise one or more processors and data storage storing instructions executable by the one or more processors to cause vehicle 702 (and/or one or more components thereof) to perform the various functions of the present method. For example, controller 720 can be configured similarly to and/or integrated within computer system 310 of vehicle 300. Alternatively or additionally, in some implementations, controller 720 may include analog and/or digital circuitry wired to perform the various functions described herein.

In some instances, controller 720 can be implemented as multiple controllers that each perform particular functions. For instance, controller 720 may comprise a LIDAR controller (e.g., microcontroller, etc.) that operates actuator(s) 712 to adjust the pointing direction of LIDAR device 710 and/or one or more rotation characteristics (e.g., phase, frequency, direction, etc.) thereof. Further, for instance, controller 720 may comprise a vehicle controller that operates other components of the vehicle 702 (e.g., communication interface 718, etc.) and facilitates communication between the LIDAR controller and other components of the vehicle 702 (e.g., SNS sensor, communication interface 718, etc.). Other examples are possible as well.

Thus, in some implementations, controller 720 may comprise a special-purpose controller (e.g., PID controller) that modulates power provided to actuator(s) 712 to adjust the pointing direction of LIDAR device 710, the one or more rotation characteristics thereof, etc. To that end, in one implementation, controller 720 may determine a target pointing direction of LIDAR device 710 based on timing information received via communication interface 718, determine a current pointing direction of LIDAR device 710 based on data from indicator(s) 714 and/or sensor(s) 716, and modulate the power provided to actuator(s) 712 to adjust the pointing direction of LIDAR device 710 based on a difference between the target pointing direction and the current pointing direction. Other examples are possible as well and are described in greater detail within exemplary embodiments herein.

External clock source(s)/system(s) 730 may comprise one or more systems that indicate a common clock signal (and/or other timing information) and transmit the common clock signal toward an environment that includes vehicles 702, 704, and 706. For example, as shown, system(s) 730 may broadcast wireless signals 740 toward a region of the environment where multiple vehicles (e.g., vehicles 702, 704, 706, etc.) are located. In turn, each vehicle may use the broadcast common clock signal (or other timing information) as a basis to determine the pointing directions of LIDARs therein (e.g., LIDAR device 710) relative to the environment of the respective vehicles. By doing so, for instance, each vehicle-mounted LIDAR may have a similar pointing direction relative to the environment, in line with the discussion of FIG. 6. As a result, for instance, the LIDAR-equipped vehicles 702, 704, 706 can mitigate or reduce LIDAR interference between one another by relying on the common clock signal from system(s) 730 to adjust the pointing directions of the LIDARs therein.

To that end, as shown, clock source(s) 730 can optionally include a satellite navigation system (SNS) 732, a data network system 734, a cellular network system 736, and/or one or more remote servers 738.

SNS 732 may comprise one or more satellite-based navigation systems, such as the Global Positioning System (GPS) system, global navigation system (GLONASS), the European global navigation satellite system (Galileo), or any other global navigation satellite system. To that end, each of vehicles 702, 704, 706 may include a suitable sensor (not shown), such as GPS 326 for instance, that is configured to receive wireless signals 740 from SNS 732 and generate a common reference clock signal based on signals 740. In one example, the reference clock signal may be a pulse per second (e.g., PPS) signal that is synchronized with an atomic clock or other clock in SNS 732. In another example, the reference clock signal may be a coordinated universal time (UTC) signal. Other examples are possible as well.

Data network system 734 may comprise one or more network servers accessible to vehicles 702 (e.g., via interface 718), 704, 706. For example, system 734 may comprise network servers connected to one another via a local area network or a private or public network (e.g., the Internet, etc.) to provide an interface for transmitting data communication packets between vehicles 702, 704, 706 and/or other network entities. To that end, in one implementation, system 734 may broadcast encrypted signals 740 towards vehicles 702, 704, 706, with timing information that can be used to synchronize the timing of the respective vehicles (and/or components thereon). In one implementation, signals 740 may indicate a network time protocol (NTP) reference clock signal (or any other network time signal) based on data from the one or more network servers accessible to vehicle 702 (via interface 718) as well as other vehicles 704, 706. Thus, vehicles 702, 704, 706 can use the timing information from system 734 to generate a common NTP reference clock signal (or other network clock signal) for timing the rotation and/or otherwise adjusting the pointing directions of the LIDARs therein (e.g., LIDAR 710) relative to an environment of vehicles 702, 704, 706.

Cellular network system 736 may comprise one or more base stations that broadcast wireless signals 740 to define a cellular coverage area of system 736. Thus, for example, if vehicles 702, 704, 706, are located within the cellular coverage area defined by signals 740, then vehicles 702, 704, 706 can receive a common reference clock signal from system 736, and use the reference clock signal to adjust the pointing directions of LIDARs mounted thereon, in line with the discussion above.

Remote server(s) 738 may include one or more servers accessible to vehicles 702 (e.g., via interface 718), 704, 706 similarly to the network servers of system 734. In some implementations, server(s) 738 may include servers of a vehicle control system that provides information to vehicles 702, 704, 706 about nearby vehicles, and/or other common information. Thus, in one implementation, server(s) 738 may communicate an indication of a selected clock source from sources 732, 734, and/or 736 that vehicles 702, 704, 706 should use to establish a common reference clock signal. In another implementation, server(s) 738 may communicate a reference clock signal to the vehicles 702, 704, 706. In yet another implementation, server(s) 738 may provide an indication, to vehicle 702 via interface 718, that vehicles 704 and 706 are proximally located within an environment of vehicle 702. In turn, vehicle 702 may establish a communication link (directly or via remote server(s) 738) with vehicles 704 and 706, and then synchronize clock signals between the three vehicles 702, 704, 706 to achieve a common reference clock signal for adjusting the pointing directions of the LIDARS (e.g., LIDAR 710, etc.) mounted to the respective vehicles. Other examples are possible as well.

It is noted that the various functional blocks illustrated in FIG. 7 can be re-arranged or physically implemented in different combinations than those shown. Thus, in some examples, the one or more of the components of vehicle 702 can be physically implemented within a single or several devices.

In a first example, although not shown, LIDAR device 710 can alternatively include one or more of actuator(s) 712, indicator(s) 714, communication interface 718, and/or controller 720. In this example, actuator(s) 712, indicator(s) 714, interface 718, and/or controller 720 can be implemented within a stationary portion (e.g., stationary platform 120) and/or a rotating portion (e.g., rotating platform 116) of LIDAR device 710. Thus, in this example, controller 720 can receive information about an orientation of vehicle 702 from sensors 716 via communication interface 718, and then adjust the pointing direction of LIDAR device 710 accordingly.

In a second example, although not shown, communication interface 718 can be at least partially implemented within a satellite navigation sensor (not shown), such as GPS 326 for instance. Thus, in this example, the satellite navigation sensor can operate interface 718 to receive signals 740 from SNS 732 and provide a reference clock signal to controller 720 for adjusting the pointing direction of LIDAR device 710.

In a third example, remote server(s) 738 can be physically implemented as a separate computing system that is not a clock source 730, but rather a control system that indicates to vehicles 702, 704, 706 which of clock sources 732, 734, 736 to use as a source for the reference clock signal.

In a fourth example, some or all of the functions described for the controller 720 can be implemented by an external system (e.g., remote server(s) 738). For instance, server(s) 738 can receive the various information collected using indicator(s) 714 and/or sensor(s) 716 of vehicle 702 and similar information from vehicles 704 and 706. In this instance, server(s) 738 can then determine a target pointing direction (relative to the environment of vehicles 702, 704, 706), and transmit an indication thereof (e.g., signals 740) for use by vehicles 702, 704, 706.

In a fifth example, some or all of the functions described for external clock source(s) 730 can be alternatively or additionally performed using a clock inside vehicles 702, 704, 706. For instance, vehicle 702 (and/or vehicles 704, 706) can include a high-precision clock mounted in vehicle 702. In this instance, controller 720 can use the internal clock for synchronizing the direction of LIDAR device 710 relative to the environment of 700. Thus, for instance, controller 720 can use the internal clock to adjust the pointing direction of LIDAR device 710 in scenarios where vehicle 702 is not connected (e.g., unable to connect, etc.) to external clock source(s) 730. Similarly, for instance, vehicles 704 and 706 can also use internal clocks therein to determine similar pointing directions for their respective LIDARs as the pointing direction of LIDAR device 710 of vehicle 702. With this arrangement, for instance, vehicles 702, 704, 706 can continue to synchronize pointing directions of their respective LIDARs without necessarily connecting to a common external clock source (or temporarily while a connection to the common external clock source is not available, etc.).

Further, it is noted that system 700 may include additional or fewer components than those shown, such as any of the components of devices 100, 200, and/or vehicles 300, 400. For example, although FIG. 7 shows three vehicles 702, 704, 706, system 700 may alternatively include fewer or additional vehicles.

Thus, in some implementations, system 700 may comprise a plurality of vehicles (e.g., 702, 704, and/or 706) including a first vehicle and a second vehicle. The first vehicle may include a first sensor (e.g., LIDAR, RADAR, SONAR, active camera, etc.) that scans a first field-of-view (FOV) defined by a first pointing direction of the first sensor. The second vehicle may include a second sensor that scans a second FOV defined by a second pointing direction of the second sensor. The system may also include a computing device (e.g., controller 720, system(s) 730), etc.) that causes the first vehicle (and/or the second vehicle) to adjust the first pointing direction (and/or the second pointing direction) such that the first and second pointing directions correspond to a same geographic direction (or are both within a threshold to a given geographic direction) in an environment of the first vehicle and the second vehicle. In various examples, the computing device of the system may be included in the first vehicle, the second vehicle, and/or an external system (e.g., remote server, etc.). To facilitate this, in some examples, the computing device of the system may use a common clock source (which may be external similar to any of clock source(s) 730) and/or respective internal clock sources of the first and second vehicles, in line with the discussion above.

Figure 8:
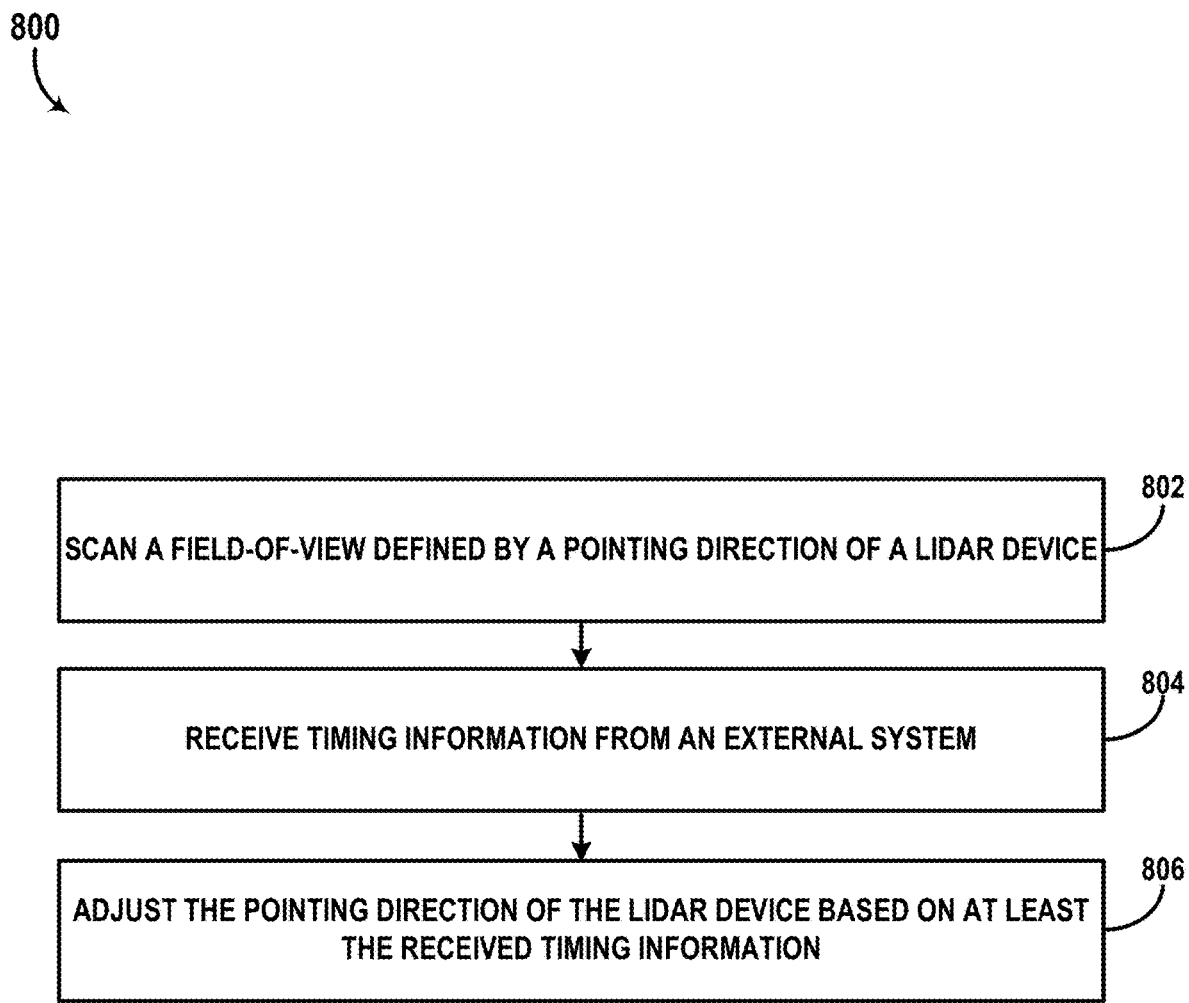
FIG. 8 is a flowchart of a method, according to an example embodiment.

FIG. 8 is a flowchart of a method 800, according to example embodiments. Method 800 presents an embodiment of a method that could be used with any of devices 100, 200, 410, 710, vehicles 300, 400, 510, 520, 530, 610, 620, 630, 702, 704, 706 and/or system 700 for example. Method 800 may include one or more operations, functions, or actions as illustrated by one or more of blocks 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 800 and other processes and methods disclosed herein, each block in FIG. 8 may represent circuitry that is wired to perform the specific logical functions in the process.

Thus, in various examples, the functions of method 800 can be implemented using controller 104, computer system 310, control system 306, controller 720 and/or system(s) 730. Further, in some examples, the various functions of method 800 can be implemented by a combination of one or more of these components. For example, the various functions of method 800 can be distributed between controller 104 and computer system 310, among other possibilities.

At block 802, method 800 involves scanning a field-of-view (FOV) defined by a pointing direction of a LIDAR device or other active sensor. Referring back to FIG. 4D by way of example, the scanned FOV may correspond to a region of an environment within contour 442 when the LIDAR device is at a first pointing direction and to the region within contour 444 when the LIDAR device is at a second pointing direction, etc.

In some implementations, method 800 may involve rotating a sensor that emits signals and detects reflections of the emitted signals based on a pointing direction of the sensor. Rotating the sensor, for example, may change the pointing direction of the sensor such that the sensor scans a region of an environment from which the emitted signals are reflected. Thus, in some implementations, the LIDAR device can be configured to rotate about an axis. In one implementation, the LIDAR device can be configured to rotate for complete rotations to scan a combined 360° FOV around the LIDAR. In another implementation, the LIDAR device can be configured to rotate within a range of pointing directions (e.g., sweep back and forth between two pointing directions). In the example of FIG. 4D for instance, the LIDAR device can be configured to scan FOVs between contours 444 and 448, etc.

In some examples, method 800 may involve using a different type of sensor (e.g., RADAR unit 332, camera 334, SONAR sensor, etc.) that emits and/or detects a different type of signal (e.g., radio waves, sound waves, etc.) instead of or in addition to the LIDAR device. For example, camera 334 may be configured as an active camera that emits a signal at a source wavelength (e.g., infrared signal, etc.) to illuminate a scene, and detects reflections of the emitted signal to scan the scene. Other examples are possible.

At block 804, method 800 involves receiving timing information from an external system. In some examples, the received timing information may correspond to signals broadcast by an external clock source (e.g., 730) toward an environment of the LIDAR device.

In a first example, the external clock source/system may relate to a satellite navigation system (e.g., system 732). Thus, in this example, a system of method 800 may include a satellite navigation sensor (e.g., GPS 328) that receives wireless signals (e.g., 740) indicating the timing information, and provides a reference clock signal based on the data received by the satellite navigation sensor.

In a second example, the external clock source/system may relate to one or more networks accessible to the LIDAR device (e.g., via communication interface 718), and a system of method 800 may thus determine a network time protocol (NTP) reference clock signal (or other network clock signal) based on data from the one or more network servers.

In a third example, the external clock source/system may relate to timing information provided by a cellular communication network (e.g., system 736) accessible to the LIDAR device (e.g., via communication interface 718, and thus a system of method 800 may determine a reference clock signal (e.g., system time, UTC time, etc.) based on data from the cellular communication network (e.g., system time from a base station, etc.).

In a fourth example, the external system may be a remote server (e.g., autonomous vehicle server) that is in communication with a system (e.g., vehicle, etc.) of method 800, in line with the discussion for server(s) 738 for instance.

In a fifth example, the external system may include a computing system (e.g., system 310, etc.) of another vehicle that does not include the LIDAR device. For instance, where the LIDAR device is mounted to a given vehicle, the given vehicle may establish one or more communication link(s) with one or more other vehicles in the environment of the given vehicle. The given vehicle may then select or establish a common clock signal for use by the given vehicle and the one or more other vehicles.

In some implementations, method 800 involves receiving the timing information at block 804 from a clock source of a system that performs method 800 in addition to or instead of receiving the timing information from the external system.

In a first example, a first vehicle may include an internal clock (e.g., high precision clock, atomic clock, or other clock) that provides the timing information at block 804 instead of the external system, and a second vehicle may include another internal clock that provides similar timing information. Thus, in this example, the first and second vehicles may use the respective timing information determined based on their respective internal clock sources to synchronize the pointing directions of their LIDARs (or other active sensors). Through this process, for instance, method 800 may allow vehicles to (at least to some extent) synchronize pointing directions of their respective LIDARs without necessarily connecting to an external system to retrieve a common external clock signal.

In a second example, a vehicle may intermittently (e.g., during initialization of the vehicle, initialization of an autonomous mode of the vehicle, initialization of a LIDAR of the vehicle, or in response to any other event) or periodically update or calibrate its internal clock using data (e.g., reference clock signal, etc.) received from the external system. The vehicle may then use the calibrated internal clock to adjust the pointing direction of its LIDAR (or other active sensor), at least for a period of time until the internal clock is re-calibrated using updated timing information from the external clock source. Similarly, another vehicle can also include an internal clock that is calibrated or updated using data the same external system. Through this process, for instance, the vehicles performing method 800 may synchronize the respective pointing directions of their LIDARs (or other active sensors) even during periods of time when a connection to the external system is unavailable or the connection to the external system is unreliable (e.g., low signal quality, etc.).

At block 806, method 800 involves adjusting the pointing direction of the LIDAR device (or other active sensor) based on at least the received timing information. As noted above, in some implementations, the LIDAR device may be configured to rotate (e.g., via actuator(s) 712) about an axis. Accordingly, in some implementations, the adjustment at block 806 may involve adjusting one or more characteristics of the rotation of the LIDAR device about the axis.

Referring back to FIG. 6 by way of example, a system of method 800 may adjust the pointing direction of the LIDAR device (and pointing directions of other proximally located LIDAR devices) toward a similar direction relative to environment 600. As another example, the system of method 800 may adjust the pointing directions of the LIDAR device and the other LIDAR devices to different directions that do not interfere/overlap with one another. For example, as a variation of the scenario in FIG. 6, the LIDARs of vehicles 610 and 630 can be adjusted to have opposite pointing directions such that contours 612 and 632 do not overlap. Other examples are possible as well.

Additionally or alternatively, in some implementations, an example system may be configured to adjust the pointing direction of a sensor (e.g., LIDAR device, etc.) by providing a modulated power signal to the sensor. In a first example, the sensor may include an array of transmitters (e.g., RADAR antennas, SONAR transducers, etc.), and the system may provide phase-shifted control signals to the individual transmitters in the array such that an effective pointing direction of the combined signal from the array is adjusted (e.g., via constructive and/or destructive interference between the individual transmitters), such as in a phased array configuration. In a second example, the sensor (e.g., LIDAR device, etc.) may include one or more light sources coupled to reflective surfaces (e.g., phased optics array) or other optical element arrangement (e.g., optical phased array) to similarly adjust the pointing direction of the sensor even if the sensor is not rotating. Other examples are possible.

Accordingly, in some implementations, method 800 may involve modulating power provided to the LIDAR device (or other active sensor) to cause the adjustment of the pointing direction of the LIDAR device.

In some implementations, method 800 may also involve determining a target rate of change to the pointing direction of the LIDAR device (or other type of sensor). For example, in implementations where the LIDAR device does not rotate (e.g., spin) repeatedly for complete rotations about an axis but rather scans across one or more predefined ranges of pointing directions, the system of method 800 may determine a target rate of change to the pointing direction within the predefined one or more ranges.

As noted above however, in some implementations, the LIDAR device may be configured to rotate (e.g., via actuator(s) 712) about an axis. To that end, in some implementations, method 800 may also involve determining a target frequency of rotation of the LIDAR device about the axis. In one example, server(s) 738 may instruct vehicles 702, 704, 706 to use a nominal rotation frequency rate (e.g., 15 Hz, 10 Hz) etc.) for their respective LIDARs. In another example, each of vehicles 702, 704, 706 may include data storage that stores an indication of the target frequency of rotation.

In some implementations, method 800 may also involve determining a yaw rate of change to a yaw direction of a vehicle that mounts the LIDAR device. For example, vehicle 702 may obtain a measurement of the yaw direction (or yaw rate) using sensor(s) 716. Further, in some examples, the yaw direction or yaw rate can be determined based on a combination of vehicle orientation sensors. For example, the vehicle may be performing a turning maneuver (which may cause the pitch and/or roll orientation of the vehicle to temporarily change) or moving along a sloped surface (e.g., a banked road or ramp that is tilted such that the vehicle may have a pitch and/or roll offset compared to a scenario where the vehicle is on a surface that is not tilted). In this example, the measurements by a "yaw sensor" aligned with axis 414 of vehicle 400 may be biased due to the pitch/roll orientation of the vehicle during the turning maneuver or while driving on the sloped surface. Accordingly, the yaw direction (or yaw rate) of the vehicle can be adjusted based on a combination of outputs from a yaw sensor (e.g., gyroscope aligned with axis 414), a pitch sensor (e.g., gyroscope aligned with axis 416), and/or a roll sensor (e.g., gyroscope aligned with axis 418), etc.

Additionally, in some implementations, method 800 may also involve determining an adjusted target rate of change to the pointing direction (or an adjusted target frequency of rotation) of the LIDAR device based on the measured yaw direction (and/or yaw rate) of the vehicle on which the LIDAR device is mounted.

In one example, determining the adjusted target rate of change may involve determining an adjustment for a direction of rotation of the LIDAR device about the axis. Referring back to FIG. 6 for instance, determining the adjusted target rate of change (or adjusted target rotation frequency) for vehicles 610, 620, 630 may involve aligning the direction of rotation of the respective LIDARs mounted thereon relative to environment 600 (e.g., either clockwise or counterclockwise, etc.).

In another example, determining the adjusted target rate of change (or the adjusted target frequency of rotation) may relate to adjusting for a yaw rate of change to the yaw direction of the vehicle on which the LIDAR device is mounted. Referring back to FIG. 6 for instance, if vehicle 630 is performing a right turn maneuver and the LIDAR device thereon has a nominal target frequency of rotation (e.g., 15 Hz) in the clockwise direction of vehicle 630, then a system of method 800 may reduce the adjusted target frequency of rotation while vehicle 630 is performing the turning maneuver. On the other hand, if the nominal target frequency of rotation is in the counterclockwise direction of vehicle 630 (or vehicle 630 is performing a left turn maneuver), then the system of method 800 may increase the adjusted target frequency of rotation while vehicle 630 is performing the turning maneuver. Thus, the adjustment in this example can be represented by equation [1] below.

$$\text{adjusted\_target\_frequency} = \text{nominal\_target\_frequency} - \text{vehicle\_yaw\_rate} \quad [1]$$

Thus, in some implementations, method 800 may also involve determining a difference between the adjusted target change to the pointing direction (or adjusted target frequency of rotation) of the LIDAR device and a measured change to the pointing direction (or measured frequency of rotation), as shown in equation [2] below.

frequency_error=adjusted_target_frequency−measured_frequency [2]

The measured_frequency, for instance, may correspond to a measured frequency of rotation of the LIDAR device relative to the vehicle on which the LIDAR device is mounted (e.g., output of indicator(s) 714). Thus, for instance, frequency_error can map the rate of change to the pointing direction of the LIDAR device relative to the vehicle to a rate of change of the pointing direction of the LIDAR device relative to the environment. Through this process, for instance, the LIDAR device can scan a region of the environment during a turning maneuver at the same scanning resolution that it would otherwise have if the vehicle was travelling in a straight path instead.

In some implementations, method 800 may also involve determining a target pointing direction of the LIDAR device based on at least the timing information received at block 806. For example, a system of method 800 may perform the computation shown in equation [3] below.

target_direction=
(360*reference_time*target_frequency−vehicle_orientation)mod(360) [3]

where target_direction is the target pointing direction, reference_time is the time or clock signal indicated by the received timing information from the external system, vehicle_orientation is a yaw direction of the vehicle in the environment (e.g., determined using sensor(s) 716), and the function mod corresponds to the modulus function. In some examples, the "target_frequency" in equation [3] can be replaced by the adjusted_target_frequency described in equation [1].

In some implementations, method 800 may also involve determining a difference between the target pointing direction and a measured pointing direction of the LIDAR device (e.g., measured using indicator(s) 714). For example, a system of method 800 may perform the computation shown in equation [4] below.

phase_error=AngleWrapper(target_direction−measured_direction) [4]

where phase_error is a difference between the phase of the rotation of the LIDAR device about the axis and a common phase of other LIDAR devices (based on the common timing information received at block 806), AngleWrapper is a function that transforms the difference between the two phases to a value between −180° and +180°, and the measured_direction is the measured position of the LIDAR device about a rotation axis thereof (e.g., axis 432).

In some implementations, method 800 may also involve modulating power provided to an actuator that rotates the LIDAR device based on: (i) a difference between the target pointing direction and the measured pointing direction, and/or (ii) a difference between the target rate of change (or target_frequency of rotation) and the measured rate of change (or measured_frequency of rotation). For example, a system of method 800 may perform the computations in equations [5] and [6] below.

combined_error=frequency_error+
phase_gain_coefficient*phase_error [5]

motor_drive_signal=MotorCon(combined_error) [6]

where combined_error is a weighted sum of the frequency_error of equation [2] and the phase_error of equation [4] (weighted by the phase_gain_coefficient). To that end, the phase_gain_coefficient may be any value that can be used to smooth variations in the phase_error due to, for example, measurement errors by the indicator(s) 714 among other possibilities. Further, motor_drive_signal may be a modulated signal provided by a controller (e.g., controller 720) to power an actuator (e.g., actuator 712) according to a configuration of a motor controller (e.g. PID controller, etc.) indicated by the function MotorCon. Thus, for example, MotorCon may be any motor controller configuration (e.g., PID controller interface, etc.) that computes a voltage or current (e.g., modulated power signal, etc.) to apply to actuator 712 based on the combined_error signal.

In some implementations, method 800 may also involve modulating the power provided to the actuator based on the frequency_error (e.g., difference between target frequency of rotation and measured frequency of rotation of LIDAR) when the frequency_error is above a threshold (e.g., adjust frequency difference first), and then modulate the power provided to the actuator based on the frequency_error and the phase_error (e.g., difference between target pointing direction of LIDAR and measured pointing direction) when the frequency_error is below the threshold. For example, by doing so, the system of method 800 may improve the transient time to achieve the target frequency of rotation (which may be less susceptible to measurement errors in the measured frequency of rotation), and then add the phase_error (together with the phase_gain_coefficient) into the combined_error signal to achieve a target phase (which may need more time due to noise in the measured position of the LIDAR device, etc.) as well.

In practice, for instance, measured_frequency may be less noisy than measured_position. Thus, improved performance may be achieved by obtaining and correcting for the difference between target_frequency (or adjusted_target_frequency) and measured_frequency first (at least within the threshold), then correcting for the difference between target_direction and measured_direction.

It is noted that implementations described above in connection with equations [1]-[6] are exemplary only. Other implementations are possible as well without departing from the scope of the present disclosure.

V. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:
a light detection and ranging (LIDAR) device that scans a field-of-view defined by a pointing direction of the LIDAR device, wherein the LIDAR device is mounted to a vehicle;
an actuator that adjusts the pointing direction of the LIDAR device;
a communication interface that receives timing information from an external system; and
a controller that (i) determines a target pointing direction based on the received timing information and (ii) causes the actuator to adjust the pointing direction of the LIDAR device based on at least the target pointing direction, wherein the timing information from the external system is also used to adjust one or more pointing directions of one or more other LIDAR devices mounted to one or more other vehicles such that the pointing direction of the LIDAR device and the one or more pointing directions of the one or more other LIDAR devices are aligned.

2. The system of claim 1, further comprising:
one or more sensors that provide an indication of an orientation of the vehicle relative to an environment of the vehicle, wherein the controller causes the actuator to adjust the pointing direction of the LIDAR device further based on data from the one or more sensors.

3. The system of claim 2, wherein the one or more sensors comprise a yaw sensor that indicates a measurement of a yaw direction of the vehicle in the environment.

4. The system of claim 2, wherein the one or more sensors comprise a yaw rate sensor that indicates a measurement of a yaw rate of change to a yaw direction of the vehicle in the environment.

5. The system of claim 1, further comprising:
one or more devices that provide an indication of an orientation of the LIDAR device relative to the vehicle, wherein the controller causes the actuator to adjust the pointing direction of the LIDAR device further based on data from the one or more devices.

6. The system of claim 5, wherein the one or more devices include a LIDAR direction indicator that indicates a measurement of the pointing direction of the LIDAR device relative to the vehicle.

7. The system of claim 5, wherein the one or more devices include a LIDAR rotation indicator that indicates a measurement of a rate of change to the pointing direction of the LIDAR device relative to the vehicle.

8. The system of claim 1, further comprising a satellite navigation system sensor associated with the communication interface, wherein the timing information relates to a reference clock signal indicated by data from the satellite navigation system sensor.

9. The system of claim 1, wherein the timing information relates to a reference clock signal indicated by data from one or more network servers accessible to the system via the communication interface.

10. The system of claim 1, wherein the timing information relates to a reference clock signal indicated by data from a cellular communication network accessible to the system via the communication interface.

11. A vehicle comprising:
a light detection and ranging (LIDAR) device that scans a field-of-view defined by a pointing direction of the LIDAR device;
an actuator that rotates the LIDAR device about an axis to adjust the pointing direction of the LIDAR device;
a communication interface that receives timing information from an external system; and
a controller that (i) determines a target pointing direction based on the received timing information and (ii) causes the actuator to adjust one or more characteristics of the rotation of the LIDAR device based on at least the target pointing direction, wherein the timing information from the external system is also used to adjust one or more characteristics of rotation of one or more other LIDAR devices mounted to one or more other vehicles such that the LIDAR device and the one or more other LIDAR devices have a common frequency and phase of rotation.

12. The vehicle of claim 11, wherein the one or more characteristics include a direction of the rotation of the LIDAR device about the axis.

13. The vehicle of claim 11, wherein the one or more characteristics include a phase of the rotation of the LIDAR device about the axis.

14. The vehicle of claim 13, further comprising:
a sensor that provides an indication of a yaw direction of the vehicle in an environment of the vehicle, wherein the controller causes the actuator to adjust the phase of the rotation further based on the yaw direction indicated by the yaw sensor.

15. The vehicle of claim 13, further comprising:
a device that indicates a measured position of the LIDAR device about the axis, wherein the controller causes the actuator to adjust the phase of the rotation further based on the measured position.

16. The vehicle of claim 11, wherein the one or more characteristics include a frequency of the rotation of the LIDAR device about the axis.

17. The vehicle of claim 16, further comprising:
a sensor that provides an indication of a yaw rate of change to a yaw direction of the vehicle in the environment, wherein the controller adjusts the frequency of the rotation of the LIDAR device about the axis further based on the yaw rate.

18. The vehicle of claim 16, further comprising:
a device that indicates a measurement of the frequency of the rotation of the LIDAR device about the axis, wherein the controller adjusts the frequency of the rotation of the LIDAR device further based on the measurement of the frequency.

19. A method comprising:
scanning, via a light detection and ranging (LIDAR) device, a field-of-view defined by a pointing direction of the LIDAR device, wherein the LIDAR device is mounted to a vehicle;
receiving, via a communication interface, timing information from an external system;
determining a target pointing direction based on at least the received timing information; and
adjusting, via an actuator, the pointing direction of the LIDAR device based on at least the target pointing direction, wherein the timing information from the external system is also used to adjust one or more pointing directions of one or more other LIDAR devices mounted to one or more other vehicles such that the pointing direction of the LIDAR device and the one or more pointing directions of the one or more other LIDAR devices are aligned.

20. The method of claim 19, further comprising:
determining a current pointing direction of the LIDAR device based on measurements indicated by one or more sensors; and
modulating power provided to the actuator based on a difference between the target pointing direction and the current pointing direction.

\* \* \* \* \*